US010693322B2

(12) United States Patent
Uchida

(10) Patent No.: US 10,693,322 B2
(45) Date of Patent: Jun. 23, 2020

(54) WIRELESS POWER TRANSFER CONTROL METHOD AND WIRELESS POWER TRANSFER SYSTEM

(71) Applicant: FUJITSU LIMITED, Kawasaki-shi, Kanagawa (JP)

(72) Inventor: Akiyoshi Uchida, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 606 days.

(21) Appl. No.: 15/351,723

(22) Filed: Nov. 15, 2016

(65) Prior Publication Data

US 2017/0063168 A1    Mar. 2, 2017

Related U.S. Application Data

(63) Continuation of application No. PCT/JP2014/063322, filed on May 20, 2014.

(51) Int. Cl.
*H02J 50/12* (2016.01)
*H02J 50/80* (2016.01)
(Continued)

(52) U.S. Cl.
CPC .............. *H02J 50/12* (2016.02); *H02J 7/025* (2013.01); *H02J 50/40* (2016.02); *H02J 50/80* (2016.02); *H02J 50/90* (2016.02)

(58) Field of Classification Search
CPC .. H02J 50/12; H02J 50/40; H02J 50/80; H02J 50/90; H02J 7/025
(Continued)

(56) References Cited

U.S. PATENT DOCUMENTS

2009/0271048 A1* 10/2009 Wakamatsu ............ G06F 1/266
700/296
2011/0309689 A1* 12/2011 Kamata ................... H02J 5/005
307/104
(Continued)

FOREIGN PATENT DOCUMENTS

CA    2868101 A1    10/2013
JP    2009-268311 A1    11/2009
(Continued)

OTHER PUBLICATIONS

Japanese Patent Application No. 2016-520838: Notification of Reasons for Refusal dated Jul. 11, 2017.
(Continued)

*Primary Examiner* — Thienvu V Tran
*Assistant Examiner* — Brian K Baxter
(74) *Attorney, Agent, or Firm* — Kratz, Quintos & Hanson, LLP

(57) ABSTRACT

A wireless power transfer control method for a system including at least one power source and at least two power receivers, wirelessly transfers power from the power source to each of the power receivers using one of magnetic field resonance and electric field resonance, including a simultaneous power transfer mode in which power is simultaneously transferred to the power receivers; and a time-division power transfer mode in which power is sequentially transferred to the power receivers by time-division switching. The wireless power transfer control method includes setting an evaluation index for each of the power receivers; and performing wireless power transfer by switching between the simultaneous power transfer mode and the time-division power transfer mode, on the basis of the evaluation index.

14 Claims, 32 Drawing Sheets

(51) Int. Cl.
  *H02J 50/90* (2016.01)
  *H02J 50/40* (2016.01)
  *H02J 7/02* (2016.01)

(58) Field of Classification Search
  USPC .......................................................... 307/104
  See application file for complete search history.

(56) References Cited

U.S. PATENT DOCUMENTS

| | | | |
|---|---|---|---|
| 2012/0001485 A1* | 1/2012 | Uchida | H02J 7/025 307/11 |
| 2012/0025760 A1 | 2/2012 | Uramoto | |
| 2012/0038317 A1 | 2/2012 | Miyamoto | |
| 2013/0278206 A1 | 10/2013 | Won | |
| 2014/0184147 A1 | 7/2014 | Uchida | |
| 2015/0008736 A1* | 1/2015 | Uchida | H02J 5/005 307/18 |
| 2015/0061398 A1* | 3/2015 | Kudo | H04B 5/0037 307/104 |
| 2015/0091379 A1* | 4/2015 | Uchida | H02J 7/025 307/11 |
| 2015/0318714 A1* | 11/2015 | Kamata | H02J 5/005 307/104 |
| 2015/0349543 A1* | 12/2015 | Sakata | H02J 50/12 307/104 |
| 2017/0338688 A1* | 11/2017 | Park | H02J 5/005 |

FOREIGN PATENT DOCUMENTS

| | | |
|---|---|---|
| JP | 2011-199975 A1 | 10/2011 |
| JP | 2012-034454 A1 | 2/2012 |
| JP | 2012-044735 A1 | 3/2012 |
| WO | 2010/116441 A1 | 10/2010 |
| WO | 2012/085119 A2 | 6/2012 |
| WO | 2013/035873 A1 | 3/2013 |
| WO | 2013/146929 A1 | 10/2013 |

OTHER PUBLICATIONS

A. Uchida, et al.; "Phase and Intensity Control of Multiple Coil Currents in Resonant Magnetic Coupling;" IMWS-IWPT2012, THU-C-1; May 10-11, 2012; pp. 53-56 (4 Sheets)/pp. 2-3 of specification.

T. Ishizaki, et al.; "3-D Free-Access WPT System for Charging Movable Terminals;" IMWS-IWPT2012, FRI-H-1; May 10-11, 2012; pp. 219-222 (4 Sheets)/p. 3 of specification.

International Search Report for International Application No. PCT/JP2014/063322 dated Jul. 22, 2014.

Written Opinion of the International Searching Authority for International Application No. PCT/JP2014/063322 dated Jul. 22, 2014 (5 Sheets, 4 Sheets translation; 9 Sheets total).

European Patent Application No. 14892875.7: Extended European Search Report dated May 4, 2017.

Korean Office Action for Patent Application No. 10-2016-7031841 dated Apr. 5, 2018 (6 Sheets).

Office Action of Korean Patent Application No. 10-2016-7031841 dated Oct. 11, 2017 with English translation (Korean 6 pages) (translation 5 pages).

Office Action of CN Patent Application No. 201480078923.7, dated Jun. 11, 2018 (19 Sheets).

* cited by examiner

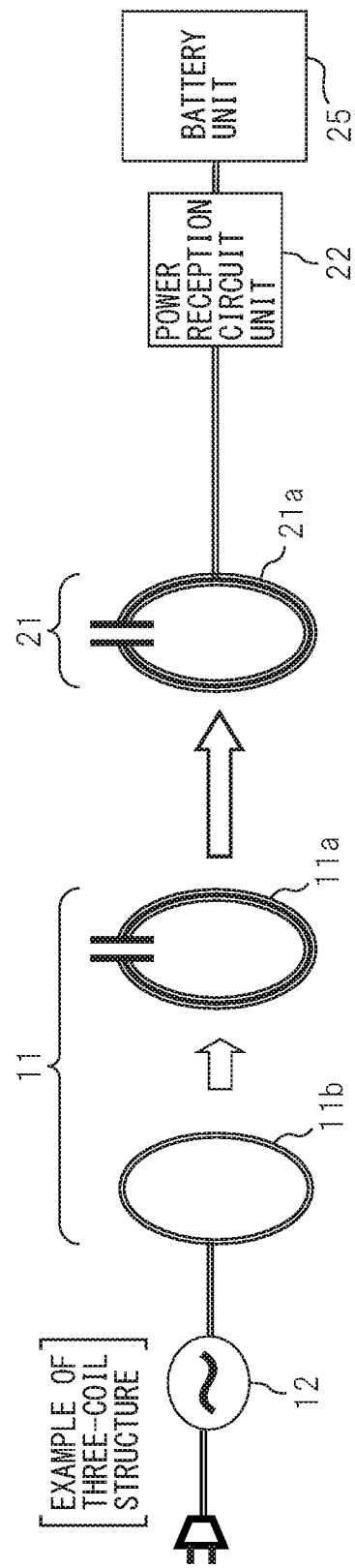

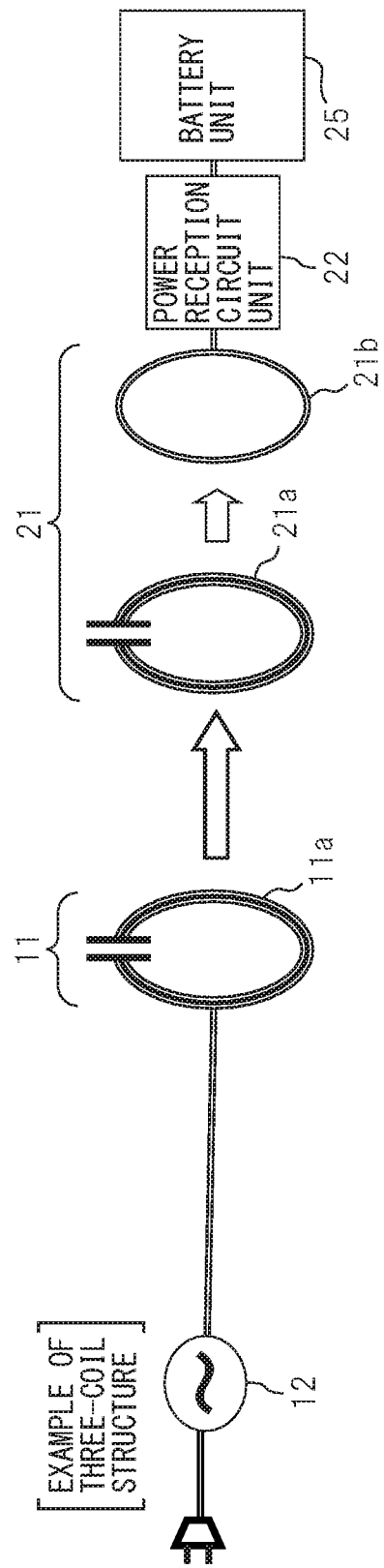

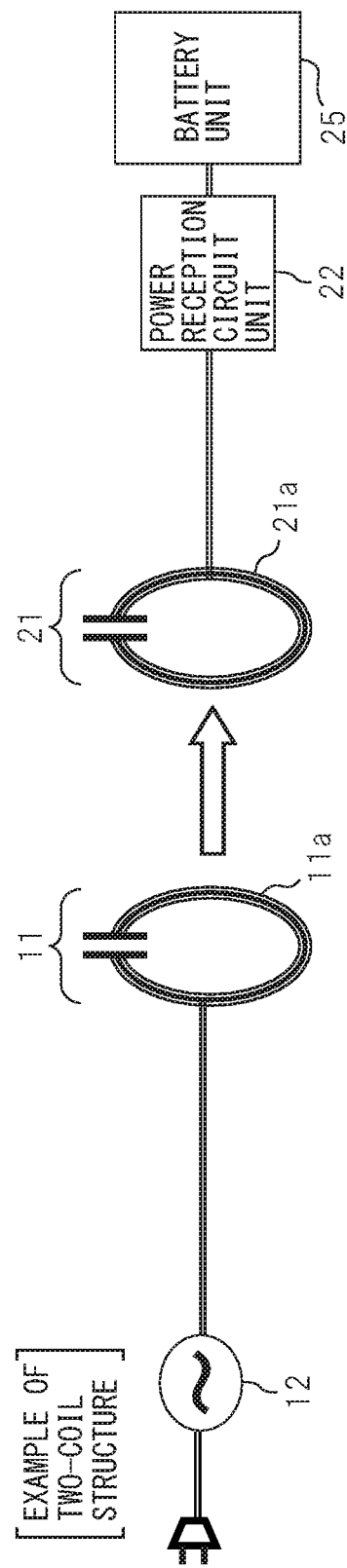

FIG. 10C

[POWER TRANSFER AT POWER RATIO OF 1:1 (9W:9W)]

EFFICIENCY OF POWER RECEIVER 2A 30.1%
EFFICIENCY OF POWER RECEIVER 2B 30.1%
　　　　　OVERALL EFFICIENCY 60.2%

⇒POWER TRANSFER OUTPUT 29.9W
　　POWER RECEIVER 2A 9W
　　POWER RECEIVER 2B 9W
　SIMULTANEOUS POWER TRANSFER
　(POWER DISTRIBUTION AT 1:1)
　IS POSSIBLE

OVERALL EFFICIENCY STAYS NEARLY CONSTANT

[POWER TRANSFER AT POWER RATIO OF 2:1 (12W:6W)]

EFFICIENCY OF POWER RECEIVER 2A 39.5%
EFFICIENCY OF POWER RECEIVER 2B 19.7%
　　　　　OVERALL EFFICIENCY 59.2%

⇒POWER TRANSFER OUTPUT 30.4W
　　POWER RECEIVER 2A 12W
　　POWER RECEIVER 2B 6W
　SIMULTANEOUS POWER TRANSFER
　(POWER DISTRIBUTION AT 2:1)
　IS POSSIBLE

FIG. 11C

POWER TRANSFER AT POWER RATIO OF 1:1(9W:9W)

EFFICIENCY OF POWER RECEIVER 2A 18.2%
EFFICIENCY OF POWER RECEIVER 2B 18.2%
　　　　　OVERALL EFFICIENCY 36.4%

⇒POWER TRANSFER OUTPUT 49.5W
　　POWER RECEIVER 2A 9W
　　POWER RECEIVER 2B 9W
　SIMULTANEOUS POWER TRANSFER
　(POWER DISTRIBUTION AT 1:1)
　IS POSSIBLE

POWER TRANSFER OUTPUT

POWER TRANSFER AT POWER RATIO OF 2:1(12W:6W)

EFFICIENCY OF POWER RECEIVER 2A 21.2%
EFFICIENCY OF POWER RECEIVER 2B 10.6%
　　　　　OVERALL EFFICIENCY 31.8%

⇒POWER TRANSFER OUTPUT 56.6W
　UPPER LIMIT EXCEEDED
　　SIMULTANEOUS POWER TRANSFER
　　(POWER DISTRIBUTION AT 2:1)IS IMPOSSIBLE

TIME-DIVISION POWER TRANSFER
(SINGLE-BODY EFFICIENCY:25%)
POWER SOURCE 2A　OUTPUT:48W　　POWER RECEIVER 1　RECEIVED POWER:12W
POWER SOURCE 2B　OUTPUT:24W　　POWER RECEIVER 2　RECEIVED POWER:6W
　　　TIME-DIVISION POWER TRANSFER IS POSSIBLE

[POWER TRANSFER DISTANCE:300mm]

[POWER TRANSFER DISTANCE: 500mm]

| DISTRIBUTION RATIO | | 1 | 1.2 | 1.4 | 1.6 | 1.8 | 2 | 2.2 | 2.4 | 2.6 | 2.8 | ③ | 3.2 | 3.4 | 3.6 | 3.8 | 4 | 4.2 | 4.4 | 4.6 | 4.8 |
|---|---|---|---|---|---|---|---|---|---|---|---|---|---|---|---|---|---|---|---|---|---|
| DISTRIBUTION RATIO | 1 | - | - | - | - | - | - | - | - | - | - | - | - | - | - | - | - | - | - | - | - |
| | 1.2 | - | - | - | - | - | - | - | - | - | - | - | - | - | - | - | - | - | - | - | - |
| | 1.4 | | | E0303 | E0304 | E0305 | E0306 | E0307 | E0308 | E0309 | E0310 | E0311 | E0312 | E0313 | E0314 | E0315 | E0316 | E0317 | E0318 | E0319 | E0320 |
| | 1.6 | | | | E0404 | E0405 | E0406 | E0407 | E0408 | E0409 | E0410 | E0411 | E0412 | E0413 | E0414 | E0415 | E0416 | E0417 | E0418 | E0419 | E0420 |
| | 1.8 | | | | | E0505 | E0506 | E0507 | E0508 | E0509 | E0510 | E0511 | E0512 | E0513 | E0514 | E0515 | E0516 | E0517 | E0518 | E0519 | E0520 |
| | ② | | | | | | E0606 | E0607 | E0608 | E0609 | E0610 | E0611 | E0612 | E0613 | E0614 | E0615 | E0616 | E0617 | E0618 | E0619 | E0620 |
| | 2.2 | | | | | | | E0707 | E0708 | E0709 | E0710 | E0711 | E0712 | E0713 | E0714 | E0715 | E0716 | E0717 | E0718 | E0719 | E0720 |
| | 2.4 | | | | | | | | E0808 | E0809 | E0810 | E0811 | E0812 | E0813 | E0814 | E0815 | E0816 | E0817 | E0818 | E0819 | E0820 |
| | 2.6 | | | | | | | | | E0909 | E0910 | E0911 | E0912 | E0913 | E0914 | E0915 | E0916 | E0917 | E0918 | E0919 | E0920 |
| | 2.8 | | | | | | | | | | E1010 | E1011 | E1012 | E1013 | E1014 | E1015 | E1016 | E1017 | E1018 | E1019 | E1020 |
| | 3 | | | | | OMITTED BECAUSE OF SYMMETRY | | | | | | E1111 | E1112 | E1113 | E1114 | E1115 | E1116 | E1117 | E1118 | E1119 | E1120 |
| | 3.2 | | | | | | | | | | | | E1212 | E1213 | E1214 | E1215 | E1216 | E1217 | E1218 | E1219 | E1220 |
| | 3.4 | | | | | | | | | | | | | E1313 | E1314 | E1315 | E1316 | E1317 | E1318 | E1319 | E1320 |
| | 3.6 | | | | | | | | | | | | | | E1414 | E1415 | E1416 | E1417 | E1418 | E1419 | E1420 |
| | 3.8 | | | | | | | | | | | | | | | E1515 | E1516 | E1517 | E1518 | E1519 | E1520 |
| | 4 | | | | | | | | | | | | | | | | E1616 | E1617 | E1618 | E1619 | E1620 |
| | 4.2 | | | | | | | | | | | | | | | | | E1717 | E1718 | E1719 | E1720 |
| | 4.4 | | | | | | | | | | | | | | | | | | E1818 | E1819 | E1820 |
| | 4.6 | | | | | | | | | | | | | | | | | | | E1919 | E1920 |
| | 4.8 | | | | | | | | | | | | | | | | | | | | E2020 |

| POWER RECEIVER 2A | POWER RECEIVER 2B | EXPECTED OVERALL EFFICIENCY |
|---|---|---|
| RESONANCE FREQUENCY | RESONANCE FREQUENCY | |
| 6.78MHz | 6.75MHz | 67% |
| FIXED VALUE | VARIABLE SET VALUE | VARIABLE ARITHMETIC VALUE |

WIRELESS POWER TRANSFER CONTROL METHOD AND WIRELESS POWER TRANSFER SYSTEM

CROSS-REFERENCE TO RELATED APPLICATION

This application is a continuation application and is based upon PCT/JP2014/063322, filed on May 20, 2014, the entire contents of which are incorporated herein by reference.

FIELD

Embodiments discussed herein relate to a wireless power transfer control method and a wireless power transfer system.

BACKGROUND

In recent years, in order to perform power supply or perform charging, wireless power transfer techniques have been gaining attention. Research and development are being conducted regarding a wireless power transfer system wirelessly performing power transfer to various electronic apparatuses such as mobile terminals and notebook computers and household electrical appliances or to power infrastructure equipment.

When wireless power transfer is used, standardization is preferably performed so that power sources which transmit power and power receivers which receive the power transmitted from the power sources are used without trouble even when they are products manufactured by different manufacturers.

Conventionally, techniques using electromagnetic induction, and techniques using radio waves are generally known as wireless power transfer techniques.

Recently, wireless power transfer techniques using strong coupling resonance have been attracting attention as techniques being capable of transferring power to a plurality of power receivers while placing each power receiver at a certain distance from a power source, and to various three-dimensional postures of each power receiver.

Wireless power transfer techniques using magnetic field resonance or electric field resonance, for example, are known as this kind of wireless power transfer using strong coupling resonance.

Conventionally, in order to perform power supply or perform charging, wireless power transfer techniques for wirelessly transferring power have been gaining attention, as described earlier. A wireless power transfer system which employs such a wireless power transfer technique normally transfers power to a plurality of power receivers and may involve power transfer control based on, for example, the power required by each power receiver or the positional relationship of each power receiver relative to the power source.

Such power transfer from a power source to a plurality of power receivers includes time-division power transfer in which power is transferred for each power receiver, and simultaneous power transfer in which power is simultaneously transferred to a plurality of power receivers. However, a wireless power transfer system including a plurality of power receivers does not perform wireless power transfer based on an evaluation index set for each power receiver, and it is therefore difficult for this system to perform appropriate wireless power transfer to each power receiver.

A variety of wireless power transfer techniques have conventionally been proposed.
Patent Document 1: Japanese Laid-open Patent Publication No. 2012-044735
Patent Document 2: International Publication No. WO 2013/035873 pamphlet Non-Patent Literature Non-Patent Document 1: UCHIDA Akiyoshi, et al., "Phase and Intensity Control of Multiple Coil Currents in Resonant Magnetic Coupling," IMWS-IWPT2012, THU-C-1, pp. 53-56, May 10-11, 2012
Non-Patent Document 2: ISHIZAKI Toshio, et al., "3-D Free-Access WPT System for Charging Movable Terminals," IMWS-IWPT2012, FRI-H-1, pp. 219-222, May 10-11, 2012

SUMMARY

According to an aspect of the embodiments, there is provided a wireless power transfer control method which includes at least one power source and at least two power receivers and wirelessly transfers power from the power source to each of the power receivers using magnetic field resonance or electric field resonance.

The wireless power transfer control method includes a simultaneous power transfer mode in which power is simultaneously transferred to the power receivers, and a time-division power transfer mode in which power is sequentially transferred to the power receivers by time-division switching.

The wireless power transfer control method sets an evaluation index for each of the power receivers, and performs wireless power transfer by switching between the simultaneous power transfer mode and the time-division power transfer mode, on the basis of the evaluation index.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4A is a diagram (1) for illustrating a modified example of a transmission coil in the wireless power transfer system of FIG. 3.
FIG. 4B is a diagram (2) for illustrating a modified example of the transmission coil in the wireless power transfer system of FIG. 3.

FIG. 4C is a diagram (3) for illustrating a modified example of the transmission coil in the wireless power transfer system of FIG. 3.

FIG. 10C is a diagram (3) for illustrating one example of the three-dimensional wireless power transfer control method for a plurality of power receivers.

FIG. 11C is a diagram (6) for illustrating one example of the three-dimensional wireless power transfer control method for a plurality of power receivers.

FIG. 23 is a diagram (1) for illustrating one example of preliminary arithmetic data in the wireless power transfer control method of the present embodiment.

FIG. 24 is a diagram (2) for illustrating one example of the preliminary arithmetic data in the wireless power transfer control method of the present embodiment.

FIG. 25 is a diagram (3) for illustrating one example of the preliminary arithmetic data in the wireless power transfer control method of the present embodiment.

DESCRIPTION OF EMBODIMENTS

First, before describing embodiments of a wireless power transfer control method and a wireless power transfer system in detail, an example of a power transfer system and a wireless power transfer system including a plurality of power sources and a plurality of power receivers according to a related art will be described, with reference to FIG. 1 to FIG. 11C.

Figure 1A:
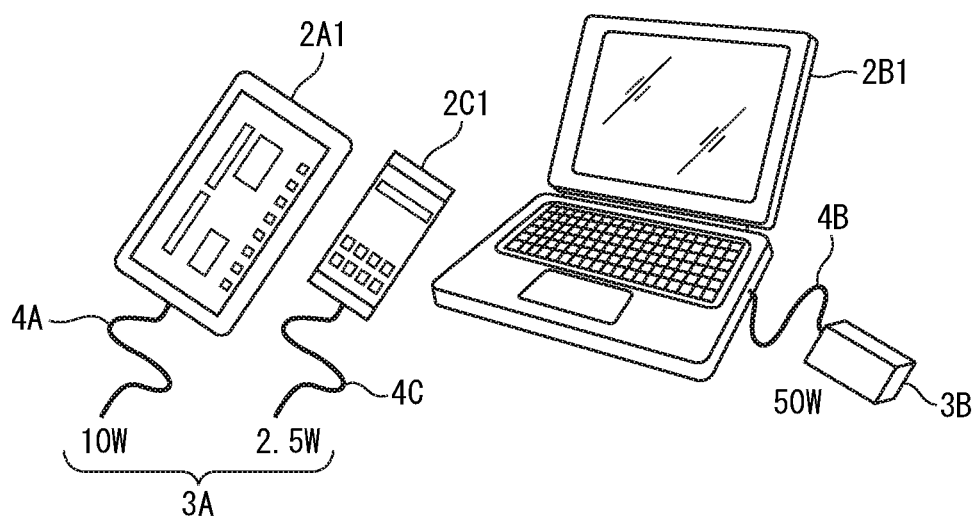
FIG. 1A is a diagram schematically depicting one example of a wired power transfer system.
Figure 1B:
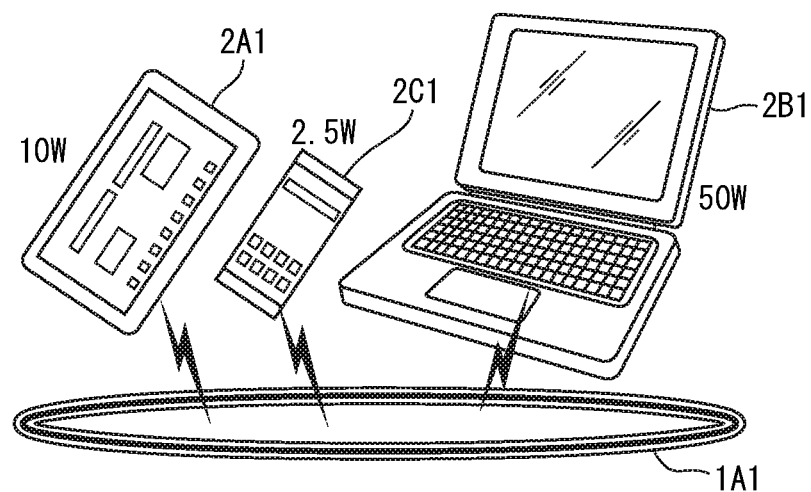
FIG. 1B is a diagram schematically depicting one example of a wireless power transfer system.

FIG. 1A is a diagram schematically depicting one example of a wired power transfer (wired power supply) system and FIG. 1B is a diagram schematically depicting one example of a wireless power transfer (wireless power supply) system. Referring to FIG. 1A and FIG. 1B, reference signs 2A1 to 2C1 denote power receivers.

The power receiver 2A1 represents, for example, a tablet computer (tablet) having a power requirement of 10 W, the power receiver 2B1 represents, for example, a notebook computer having a power requirement of 50 W, and the power receiver 2C1 represents, for example, a smartphone having a power requirement of 2.5 W. The power requirements correspond to, for example, powers for charging the rechargeable batteries (secondary batteries) in the respective power receivers 2A1 to 2C1.

As depicted in FIG. 1A, generally, when the secondary batteries of the tablet 2A1 and the smartphone 2C1 are charged, for example, the tablet 2A1 and the smartphone 2C1 are connected to a USB (Universal Serial Bus) terminal (or a dedicated power supply or the like) 3A of a Personal Computer via power supply cables 4A and 4C. When the secondary battery of the notebook computer 2B1 is charged, for example, the notebook computer 2B1 is connected to a dedicated power supply (AC-DC Converter) 3B via a power supply cable 4B.

In other words, even for the portable power receivers 2A1 to 2C1, wired power supply (wired power transfer) is generally performed from the USB terminal 3A and the power supply 3B using the power supply cables 4A to 4C, as depicted in FIG. 1A.

With the recent advance in non-contact power supply technology typified by electromagnetic induction, for example, wireless power supply (wireless power transfer) has come into practice in a shaver or an electric toothbrush. For example, power may be wirelessly transferred from a power source 1A1 to the tablet 2A1, the notebook computer 2B1, and the smartphone 2C1, as depicted in FIG. 1B.

Figure 2A:
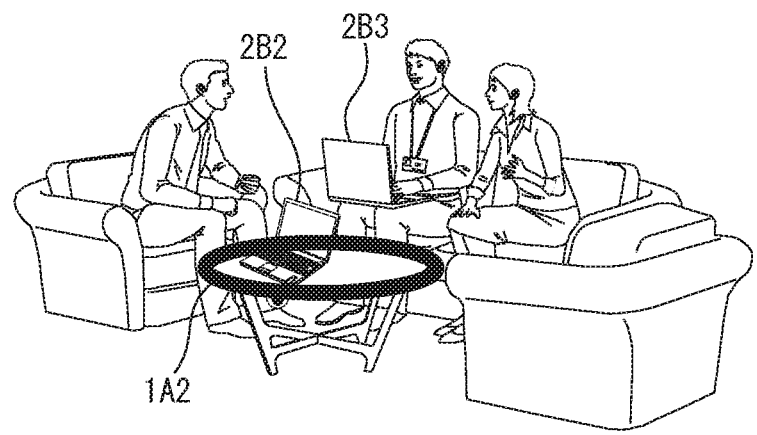
FIG. 2A is a diagram schematically depicting one example of a two-dimensional wireless power transfer system.

FIG. 2A is a diagram schematically depicting one example of a two-dimensional wireless power transfer (two-dimensional wireless power supply) system, and illustrates, for example, how power is wirelessly transferred by electromagnetic induction, as in, for example, the above-mentioned shaver or electric toothbrush.

As depicted in FIG. 2A, when power is wirelessly transferred using electromagnetic induction, power may be supplied to only a power receiver which is nearly in contact with a power source 1A2 because of the short power transfer distance even in non-contact power supply.

In other words, although power may be supplied to a power receiver (notebook computer) 2B2 placed on the power source (power receiver mount) 1A2, it is difficult to supply power to a notebook computer 2B3 separated from the power receiver mount 1A2. In this manner, the wireless power transfer system depicted in FIG. 2A serves as a two-dimensional wireless power supply system which enables free arrangement on the power receiver mount 1A2.

Figure 2B:
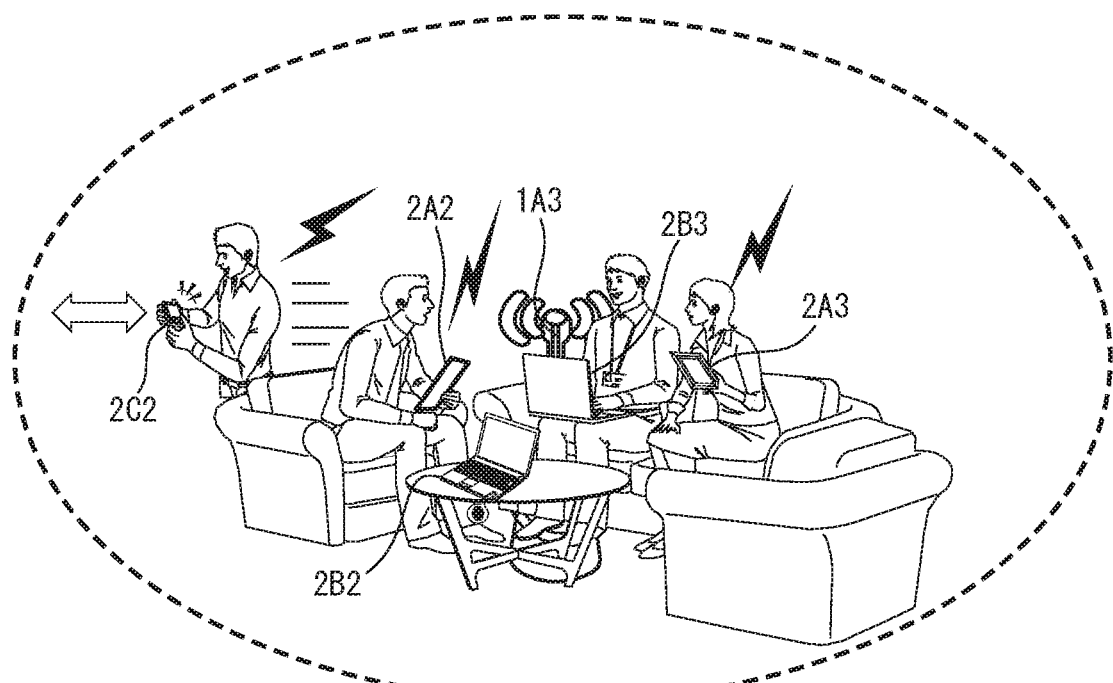
FIG. 2B is a diagram schematically depicting one example of a three-dimensional wireless power transfer system.

FIG. 2B is a diagram schematically depicting one example of a three-dimensional wireless power transfer (three-dimensional wireless power supply) system, and illustrates, for example, how power is wirelessly transferred using magnetic field resonance or electric field resonance. As depicted in FIG. 2B, when power is wirelessly transferred using magnetic field resonance or electric field resonance, power may be supplied from the power source 1A2 to a plurality of power receivers which fall within a predetermined range (the interior of a broken line in FIG. 2B).

In other words, power may be wirelessly transferred from a power source 1A3 to tablets 2A2 and 2A3, the notebook computers 2B2 and 2B3, and a smartphone 2C2 that fall within a predetermined range. Although FIG. 2B depicts only one power source 1A3, a plurality of power sources wirelessly transfer power to a plurality of power receivers at various angles and positions, using magnetic field resonance or electric field resonance.

In this manner, the wireless power transfer system depicted in FIG. 2B serves as, for example, a three-dimensional wireless power supply system which uses magnetic field resonance to enable a high power transfer efficiency even in a space farther than that using electromagnetic induction.

Figure 3:
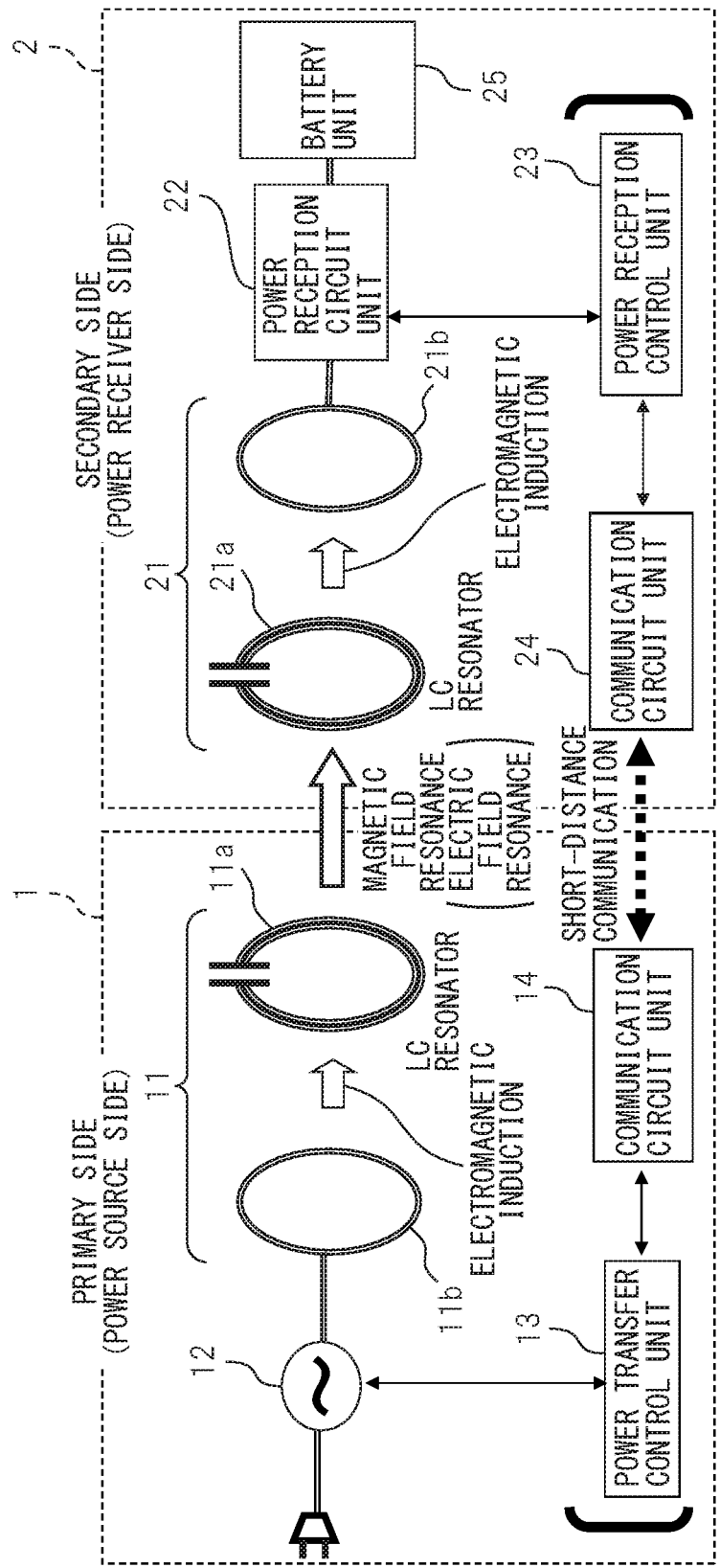
FIG. 3 is a block diagram schematically depicting one example of a wireless power transfer system.

FIG. 3 is a block diagram schematically depicting one example of a wireless power transfer (three-dimensional wireless power supply) system. In FIG. 3, reference sign 1 denotes a primary side (a power source side: a power source), and reference sign 2 denotes a secondary side (a power receiver side: a power receiver).

As depicted in FIG. 3, the power source 1 includes a wireless power transfer unit 11, a high frequency power supply unit 12, a power transfer control unit 13, and a communication circuit unit (a first communication circuit unit) 14. In addition, the power receiver 2 includes a wireless power reception unit 21, a power reception circuit unit (a rectifier unit) 22, a power reception control unit 23, and a communication circuit unit (a second communication circuit unit) 24.

The wireless power transfer unit 11 includes a first coil (a power supply coil) 11b and a second coil (a power source resonance coil) 11a, and the wireless power reception unit 21 includes a third coil (a power receiver resonance coil) 21a and a fourth coil (a power extraction coil) 21b.

As depicted in FIG. 3, the power source 1 and the power receiver 2 perform energy (electric power) transmission from the power source 1 to the power receiver 2 by magnetic field resonance (electric field resonance) between the power source resonance coil 11a and the power receiver resonance coil 21a. Power transfer from the power source resonance coil 11a to the power receiver resonance coil 21a may be performed not only by magnetic field resonance but also electric field resonance or the like. However, the following description will be given mainly by way of example of magnetic field resonance.

The power source 1 and the power receiver 2 communicate with each other (near field communication) by the communication circuit unit 14 and the communication circuit unit 24. Note that, a distance of power transfer (a power transfer range) by the power source resonance coil 11a of the power source 1 and the power receiver resonance coil 21a of the power receiver 2 is set to be shorter than a distance of communication (a communication range) by the communication circuit unit 14 of the power source 1 and the communication circuit unit 24 of the power receiver 2.

In addition, power transfer by the power source resonance coil 11a and the power receiver resonance coil 21a is performed by a system (an out-band communication) independent from communication by the communication circuit units 14 and 24. Specifically, power transfer by the resonance coils 11a and 21a uses, for example, a frequency band of 6.78 MHz, whereas communication by the communication circuit units 14 and 24 uses, for example, a frequency band of 2.4 GHz.

The communication by the communication circuit units 14 and 24 may use, for example, a DSSS wireless LAN system based on IEEE 802.11b or Bluetooth (registered trademark).

The above described wireless power transfer system performs power transfer using magnetic field resonance or electric field resonance by the power source resonance coil 11a of the power source 1 and the power receiver resonance coil 21a of the power receiver 2, for example, in a near field at a distance of about a wavelength of a frequency used. Accordingly, the range of power transfer (a power transfer range) varies with the frequency used for power transfer.

The high frequency power supply unit 12 supplies power to the power supply coil (the first coil) 11b, and the power supply coil 11b supplies power to the power source resonance coil 11a arranged very close to the power supply coil 11b by using electromagnetic induction. The power source resonance coil 11a transfers power to the power receiver resonance coil 21a (the power receiver 2) at a resonance frequency that causes magnetic field resonance between the resonance coils 11a and 21a.

The power receiver resonance coil 21a supplies power to the power extraction coil (the fourth coil) 21b arranged very close to the power receiver resonance coil 21a, by using electromagnetic induction. The power extraction coil 21b is connected to the power reception circuit unit 22 to extract a predetermined amount of power. The power extracted from the power reception circuit unit 22 is used, for example, for charging a battery in a battery unit (load) 25, as a power supply output to the circuits of power receiver 2, or the like.

Note that, the high frequency power supply unit 12 of the power source 1 is controlled by the power transfer control unit 13, and the power reception circuit unit 22 of the power receiver 2 is controlled by the power reception control unit 23. Then, the power transfer control unit 13 and the power reception control unit 23 are connected via the communication circuit units 14 and 24, and adapted to perform various controls so that power transfer from the power source 1 to the power receiver 2 may be performed in an optimum state.

FIG. 4A to FIG. 4C are diagrams for illustrating modified examples of a transmission coil in the wireless power transfer system of FIG. 3. Note that, FIG. 4A and FIG. 4B depict exemplary three-coil structures, and FIG. 4C depicts an exemplary two-coil structure.

Specifically, in the wireless power transfer system depicted in FIG. 3, the wireless power transfer unit 11 includes the first coil 11b and the second coil 11a, and the wireless power reception unit 21 includes the third coil 21a and the fourth coil.

On the other hand, in the example of FIG. 4A, the wireless power reception unit 21 is set as a single coil (a power receiver resonance coil: an LC resonator) 21a, and in the example of FIG. 4B, the wireless power transfer unit 11 is set as a single coil (a power source resonance coil: an LC resonator) 11a.

Further, in the example of FIG. 4C, the wireless power reception unit 21 is set as a single power receiver resonance coil 21a and the wireless power transfer unit 11 is set as a single power source resonance coil 11a. Note that, FIG. 4A to FIG. 4C are merely examples and, obviously, various modifications may be made.

FIG. 5A to FIG. 5D are circuit diagrams depicting examples of an independent resonance coil (the power receiver resonance coil 21a), and FIG. 6A to FIG. 6D are circuit diagrams depicting examples of a resonance coil (the power receiver resonance coil 21a) connected to a load or a power supply.

Note that, FIG. 5A to FIG. 5D correspond to the power receiver resonance coil 21a of FIG. 3 and FIG. 4B, and FIG. 6A to FIG. 6D correspond to the power receiver resonance coil 21a of FIG. 4A and FIG. 4C.

Figure 5A:
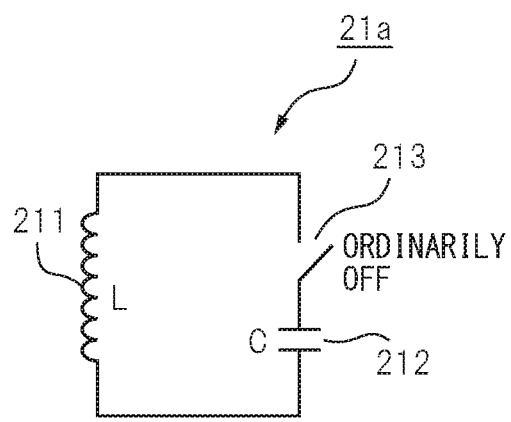
FIG. 5A is a circuit diagram (1) depicting an example of an independent resonance coil.
Figure 5B:
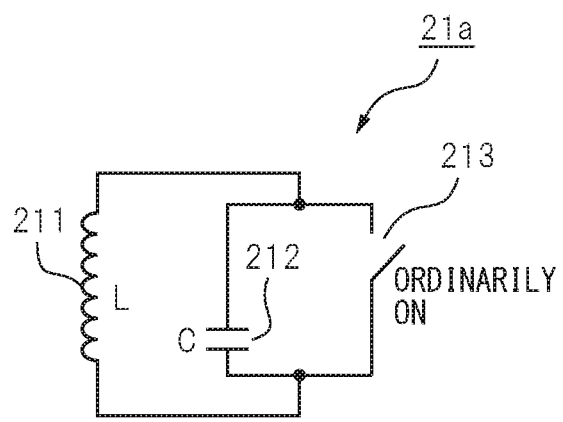
FIG. 5B is a circuit diagram (2) depicting an example of the independent resonance coil.
Figure 6A:
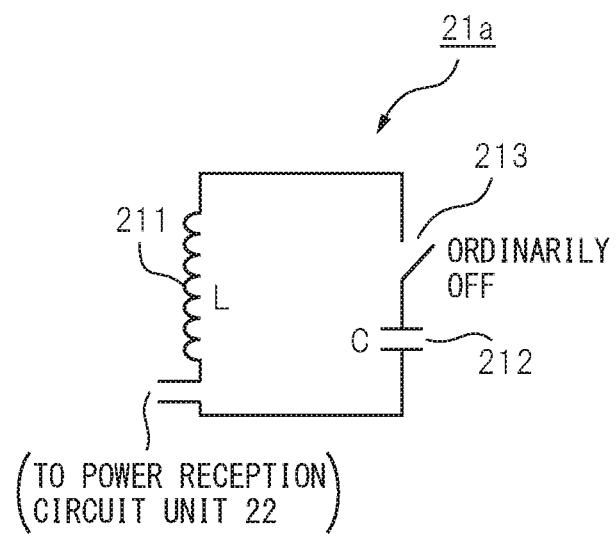
FIG. 6A is a circuit diagram (1) depicting an example of a resonance coil connected to a load or a power supply.

In the examples depicted in FIG. 5A and FIG. 6A, the power receiver resonance coil 21a includes a coil (L) 211, a capacitor (C) 212, and a switch 213 connected in series, in which the switch 213 is ordinarily in an off-state. In the examples depicted in FIG. 5B and FIG. 6B, the power receiver resonance coil 21a includes the coil (L) 211 and the capacitor (C) 212 connected in series, and the switch 213 connected in parallel to the capacitor 212, in which the switch 213 is ordinarily in an on-state.

Figure 5C:
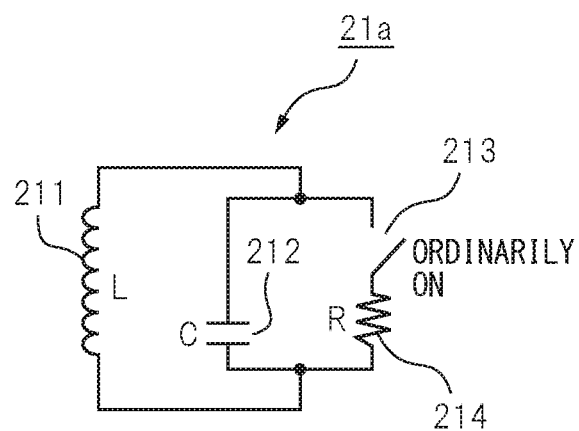
FIG. 5C is a circuit diagram (3) depicting an example of the independent resonance coil.
Figure 6B:
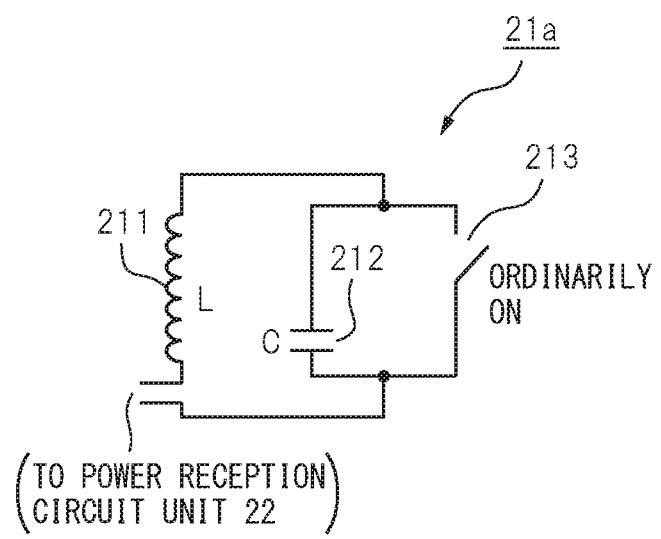
FIG. 6B is a circuit diagram (2) depicting an example of the resonance coil connected to the load or the power supply.
Figure 6C:
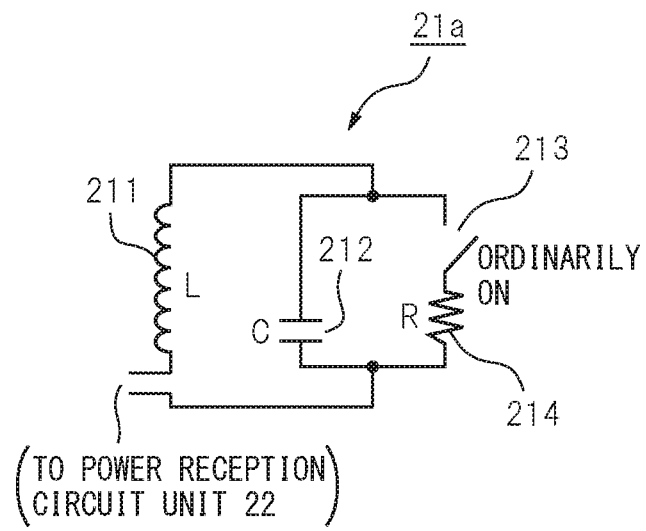
FIG. 6C is a circuit diagram (3) depicting an example of the resonance coil connected to the load or the power supply.

In the examples depicted in FIG. 5C and FIG. 6C, the power receiver resonance coil 21a of FIG. 5B and FIG. 6B includes the switch 213 and the resistance (R) 214 connected in series and arranged in parallel to the capacitor 212, in which the switch 213 is ordinarily in the on-state.

Figure 5D:
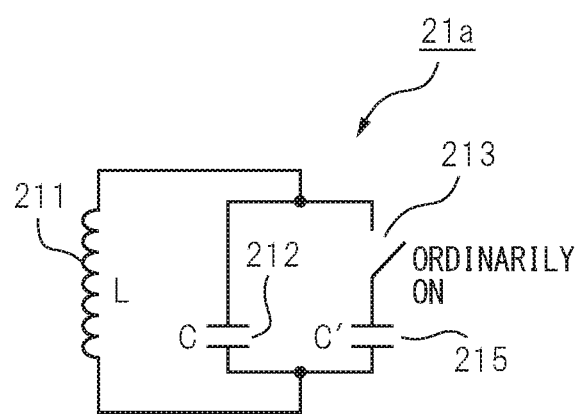
FIG. 5D is a circuit diagram (4) depicting an example of the independent resonance coil.
Figure 6D:
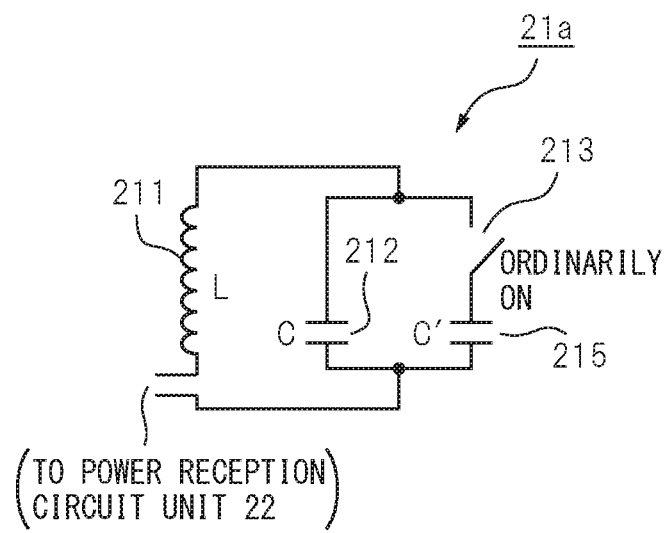
FIG. 6D is a circuit diagram (4) depicting an example of the resonance coil connected to the load or the power supply.

The examples of FIG. 5D and FIG. 6D depict the power receiver resonance coil 21a of FIG. 5B and FIG. 6B, in which the switch 213 and another capacitor (C') 215 connected in series are arranged in parallel to the capacitor 212, and the switch 213 is ordinarily in the on-state.

In each of the power receiver resonance coils 21a described above, the switch 213 is set to "off" or "on" so that the power receiver resonance coil 21a does not operate ordinarily. The reason for this is, for example, to prevent heat generation or the like caused by power transfer to a power receiver 2 not in use (on power receiver) or to a power receiver 2 out of order.

In the above structure, the power source resonance coil 11a of the power source 1 may also be set as in FIG. 5A to FIG. 5D and FIG. 6A to FIG. 6D. However, the power source resonance coil 11a of the power source 1 may be set so as to operate ordinarily and may be controlled to be turned ON/OFF by an output of the high frequency power supply unit 12. In this case, in the power source resonance coil 11a, the switch 213 is to be short-circuited in FIG. 5A and FIG. 6A.

In this manner, when a plurality of power receivers 2 are present, selecting only the power receiver resonance coil 21a of a predetermined power receiver 2 for receiving power transmitted from the power source 1 and making the power receiver resonance coil 21a operable enables power to be transferred (time-division power transfer) to the selected power receiver 2.

Figure 7A:
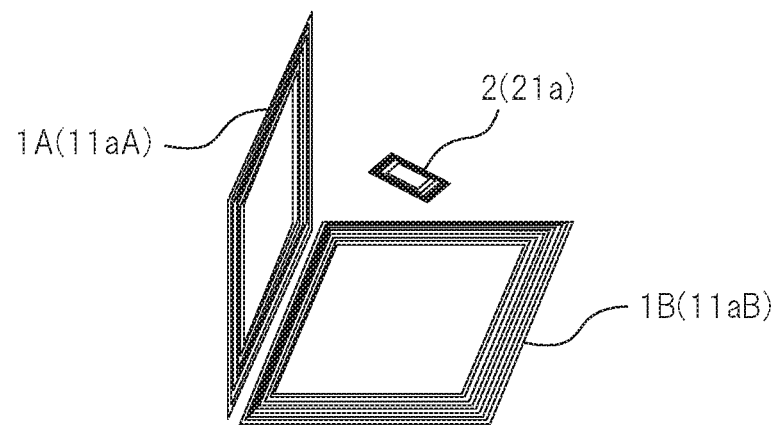
FIG. 7A is a diagram (1) for illustrating an example of controlling a magnetic field by a plurality of power sources.
Figure 7B:
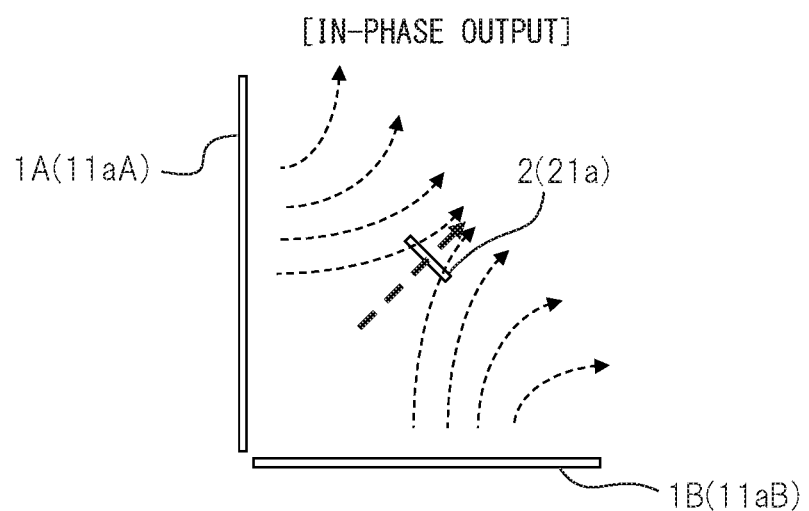
FIG. 7B is a diagram (2) for illustrating an example of controlling a magnetic field by the plurality of power sources.
Figure 7C:
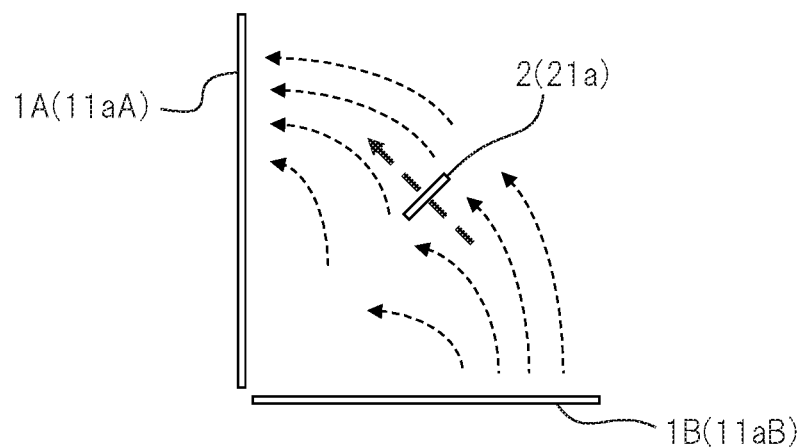
FIG. 7C is a diagram (3) for illustrating an example of controlling a magnetic field by the plurality of power sources.

FIG. 7A to FIG. 7C are diagrams for illustrating examples of controlling a magnetic field by a plurality of power sources. In FIG. 7A to FIG. 7C, reference signs 1A and 1B denote power sources, and reference sign 2 denotes a power receiver.

As depicted in FIG. 7A, a power source resonance coil 11aA for power transfer used for magnetic field resonance of the power source 1A and a power source resonance coil 11aB for power transfer used for magnetic field resonance of the power source 1B are arranged, for example, so as to be orthogonal to each other.

Further, the power receiver resonance coil 21a used for magnetic field resonance of the power receiver 2 is arranged at a different angle (an angle not parallel) at a position surrounded by the power source resonance coils 11aA and 11aB.

Note that, the power source resonance coils (LC resonators) 11aA and 11aB may also be provided in a single power source. In other words, a single power source 1 may include a plurality of wireless power transfer units 11.

FIG. 7B depicts a situation in which the power source resonance coils 11aA and 11aB output an in-phase magnetic field, and FIG. 7C depicts a situation in which the power source resonance coils 11aA and 11aB output a reverse phase magnetic field.

For example, by comparing the cases where the two orthogonal power source resonance coils 11aA and 11aB output an in-phase magnetic field and a reverse phase magnetic field, a synthesized magnetic field becomes a 90° rotation relationship in each other, so that power transfer is carried out to each power receiver 2 (power receiver resonance coil 21a) with suitably transmitting from the power source resonance coils 11aA and 11aB based on the postures of the power receiver 2.

As described above, when power is transferred to the power receiver 2 positioned at an arbitrary position and an arbitrary posture (angle) by the plurality of power sources 1A and 1B, magnetic fields occurring in the power source resonance coils 11aA and 11aB of the power sources 1A and 1B change variously.

The above-mentioned wireless power transfer system includes a plurality of power sources and at least one power receiver and adjusts outputs (strengths and phases) between the plurality of power sources according to positions (X, Y and Z) and postures ($\theta_X$, $\theta_Y$ and $\theta_Z$) of the power receiver.

In addition, it will be seen that, with respect to three-dimensional space, for example, using three or more power sources in the actual three-dimensional space to adjust the respective output phase differences and the output intensity ratios may control the magnetic field (electric field) to any direction in the three-dimensional space.

Figure 8A:
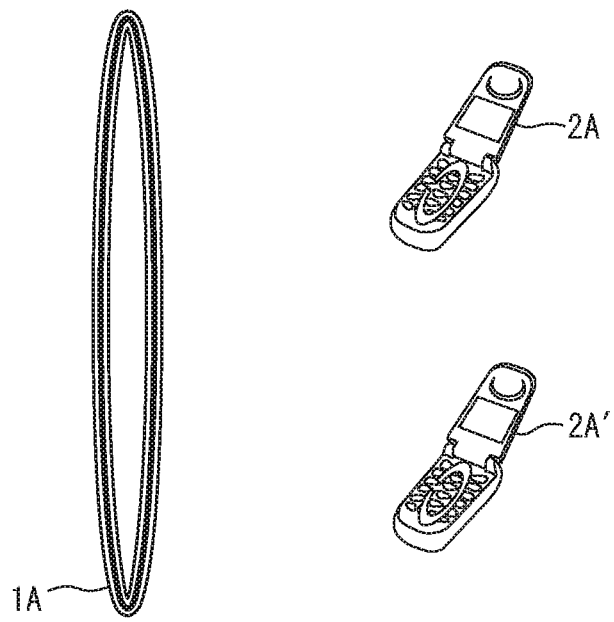
FIG. 8A is a diagram (1) for illustrating wireless power transfer to a plurality of power receivers.
Figure 8B:
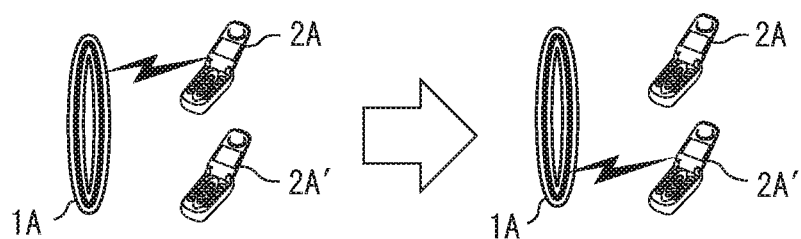
FIG. 8B is a diagram (2) for illustrating wireless power transfer to the plurality of power receivers.
Figure 8C:
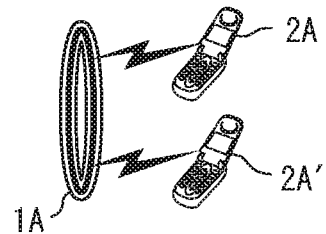
FIG. 8C is a diagram (3) for illustrating wireless power transfer to the plurality of power receivers.

FIG. 8A to FIG. 8C are diagrams for illustrating wireless power transfer to a plurality of power receivers. For the sake of simplicity, although FIG. 8A to FIG. 8C depict only one power source 1A and two power receivers (mobile phones) 2A and 2A', the number of power sources and the number and types of power receivers or the like may obviously vary. In other words, assume that one power source 1A is used to wirelessly supply power to the two power receivers 2A and 2A', as depicted in FIG. 8A.

First, in wireless power supply by time-division power transfer, power is supplied to only one power receiver 2A, as depicted on the left of FIG. 8B, and power is then supplied to only the other power receiver 2A, as depicted on the right of FIG. 8B. The same applies when a larger number of power receivers are used, and power is wirelessly supplied to power receivers by sequentially switching the power receivers to be supplied with power in a time-division manner.

In other words, in time-division power transfer, when a plurality of power receivers are provided, power receivers to be supplied with power are sequentially selected to allow one power receiver to always correspond to the power source at a certain moment. At this time, control may be done as in, for example, the case where power sources and power receivers are provided in one-to-one correspondence. However, as a result of time division, the time taken for power supply (full charging) corresponds to the number of power receivers, and the time to supply power to two power receivers is therefore twice that to supply power to one power receiver.

Then, in wireless power supply by simultaneous power transfer, one power source 1A supplies power to both the two power receivers 2A and 2A', as depicted in FIG. 8C. The same applies when a larger number of power receivers are used, and power is simultaneously, wirelessly supplied to the plurality of power receivers.

In this simultaneous power transfer, when, for example, two power receivers are provided, since power is simultaneously supplied to the two power receivers, and it suffices to supply power for a time corresponding to only one power receiver may be sufficient regardless of the number of power receivers to be simultaneously supplied with power, this power supply method (wireless power transfer control method) is desirable in terms of user benefits.

However, for simultaneous power supply (simultaneous power transfer) to a plurality of power receivers, control is done differently from the case of only one power receiver. Further, in simultaneous power transfer to a plurality of power receivers, power receivers may not always be selected because of problems in terms of, for example, the power transfer upper limit and efficiency. When a large number of power receivers are provided, it is possible to perform simultaneous power transfer to some of the plurality of power receivers while performing time-division power transfer to other power receivers.

Figure 9A:
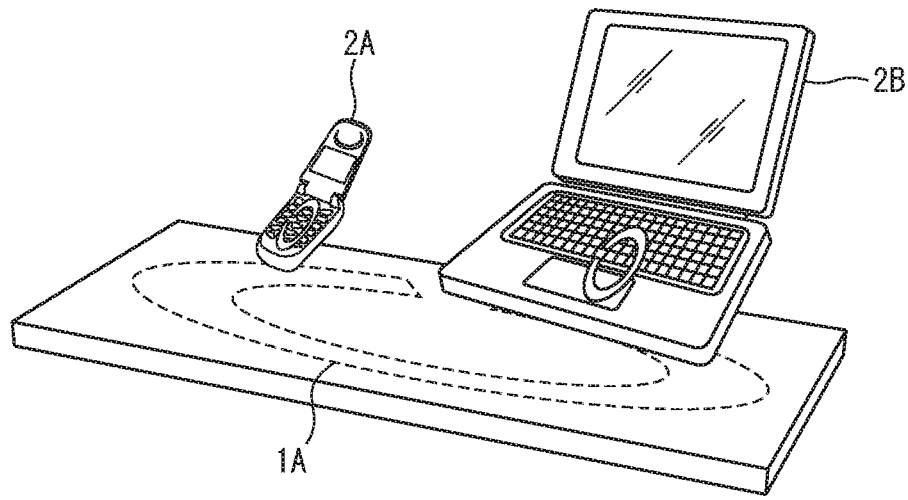
FIG. 9A is a diagram (1) for illustrating one example of a two-dimensional wireless power transfer control method for a plurality of power receivers.
Figure 9B:
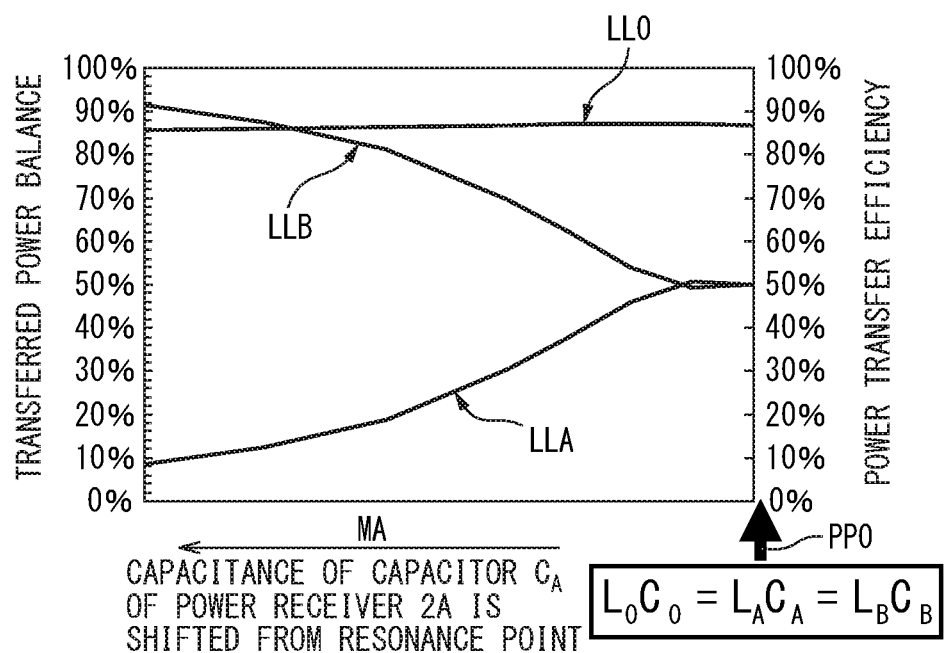
FIG. 9B is a diagram (2) for illustrating one example of the two-dimensional wireless power transfer control method for the plurality of power receivers.

FIG. 9A and FIG. 9B are diagrams for illustrating one example of a two-dimensional wireless power transfer control method for a plurality of power receivers. FIG. 9A illustrates, for example, how power is wirelessly supplied to two power receivers 2A and 2B having different power requirements by one power source 1A, using magnetic field resonance. Referring to FIG. 9B, reference sign LL0 denotes the overall power transfer efficiency; LLA, the power received by the mobile phone 2A; and LLB, the power received by the notebook computer 2B.

The power receiver 2A represents, for example, a mobile phone having a power requirement of 5 W and the power receiver 2B represents, for example, a notebook computer having a power requirement of 50 W. For the sake of simplicity, an LC resonator (a wireless power reception unit) for the mobile phone 2A and an LC resonator for the notebook computer 2B have the same specifications.

In the two-dimensional wireless power transfer system, in simultaneous wireless power supply to a plurality of power receivers, the amount of power received by each power receiver may often be different. For example, as depicted in FIG. 9A, even for a mobile phone having a power requirement of 5 W and a notebook computer having a power requirement of 50 W, or for the same types of power receivers, the power requirement may be different depending on the remaining battery level.

Under the circumstances, for example, in the two-dimensional wireless power transfer system, since the distance or posture conditions of the power receivers 2A and 2B placed on the power source 1A may have only a small difference, power is equally distributed when they are equipped with power receiver coils having the same specifications.

Thus, as depicted in FIG. 9A, even for power receivers 2A and 2B having power requirements different by 10 times, when, for example, an output corresponding to a power requirement of 55 W is output from the power source 1A, the power receivers 2A and 2B each receive a power of 27.5 W.

In other words, the mobile phone 2A and the notebook computer 2B include, for example, power receiver resonance coils 21a as depicted in FIG. 5A, and the inductances of their coils 211 and the capacitances of their capacitors 212 take equal values.

Specifically, let $L_A$ be the inductance in the power receiver resonance coil of the mobile phone 2A, $C_A$ be its capacitance, $L_B$ be the inductance in the power receiver resonance coil of the notebook computer 2B, and $C_B$ be its capacitance. Then, as indicated by reference sign PP0, $L_0C_0=L_AC_A=L_BC_B$ holds in the as-is state (the state in which the resonance point is not shifted).

Accordingly, assuming, for example, that the power transferred from the power source 1A is 68.75 W and its power transfer efficiency is 80%, both the mobile phone 2A and the notebook computer 2B receive a power of 27.5 W.

However, since the mobile phone 2A has a power requirement of 5 W and the notebook computer 2B has a power requirement of 50 W, the resonance point of the power receiver resonance coil of the mobile phone 2A is shifted to control the power reception efficiency to lower it.

For example, as indicated by an arrow MA in FIG. 9B, the capacitance $C_A$ of the capacitor in the power receiver resonance coil of the mobile phone 2A is controlled to be lower (or higher) to make a shift from the resonance point of the power receiver resonance coil that maximizes the power reception efficiency.

In other words, as indicated by the arrow MA in FIG. 9B, intentionally shifting the resonance condition (shifting the capacitance $C_A$) reduces the Q value so that the received power LLA of the mobile phone 2A can be gradually decreased from 27.5 W at the resonance point (P0) and, for example, set to a power requirement of 5 W.

In this case, most of power that is not received by the mobile phone 2A becomes power received by the notebook computer 2B. In other words, obviously, the received power LLB of the notebook computer 2B increases with a reduction in received power LLA of the mobile phone 2A, and the overall power transfer efficiency LL0 in the wireless power transfer system lowers only slightly.

In this manner, changing the resonance condition and, specifically, changing the capacitance value (capacitance $C_A$) of the resonance capacitor (the capacitor) 212 of the power receiver 2A may adjust coupling, thus controlling the received power to a desired distribution ratio.

Importantly, even when the efficiency of the power receiver 2A whose resonance condition has been changed lowers, the power transmission and reception efficiency of the entire system is maintained nearly constant and the power to the power receiver 2B increases by the amount of reduction in power having reached the power receiver 2A. As a result, obviously, compared to single-body power supply to only one of the power receivers 2A and 2B, received power may be distributed at a desired ratio while power is supplied to the entire system (both the power receivers 2A and 2B) at nearly the same efficiency.

Since each power source is assumed to individually have an upper limit in its power transfer capacity, the two-dimensional wireless power transfer system may easily determine whether simultaneous power supply is possible in, for example, the following way.

In other words, since the power transmission and reception efficiency of the entire system stays nearly constant, it is simply determined that simultaneous power supply is performed for Overall Received Power/Efficiency≤Maximum Power Transfer and time-division power supply is performed for Overall Received Power/Efficiency>Maximum Power Transfer.

A three-dimensional wireless power transfer system will be described below. FIG. 10A to FIG. 11C are diagrams for illustrating one example of a three-dimensional wireless power transfer control method for a plurality of (two) power receivers. For the sake of simplicity, although FIG. 10A to FIG. 11C depict only one power source 1A and two power receivers 2A and 2B, the same applies when a plurality of power sources and three or more power receivers are used.

Figure 10A:
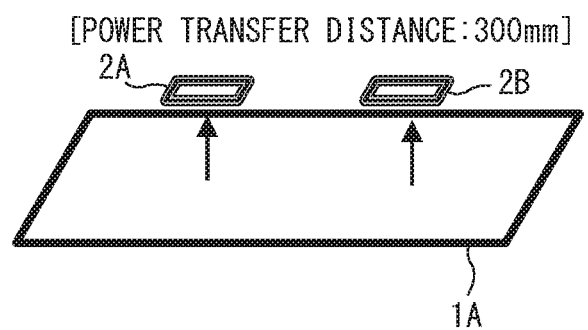
FIG. 10A is a diagram (1) for illustrating one example of a three-dimensional wireless power transfer control method for a plurality of power receivers.
Figure 10B:
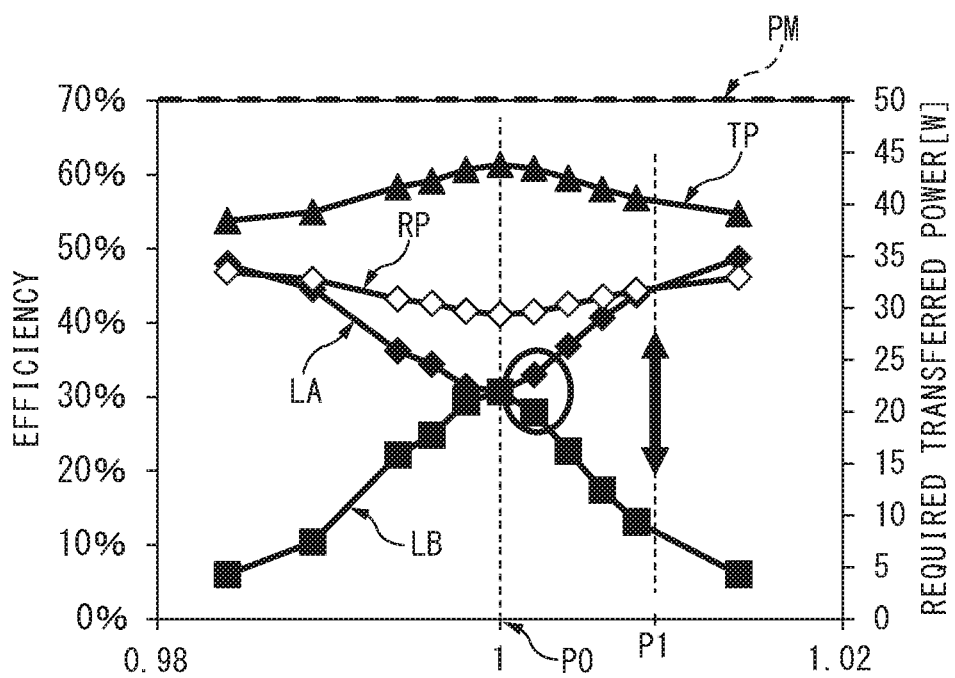
FIG. 10B is a diagram (2) for illustrating one example of the three-dimensional wireless power transfer control method for a plurality of power receivers.
Figure 11A:
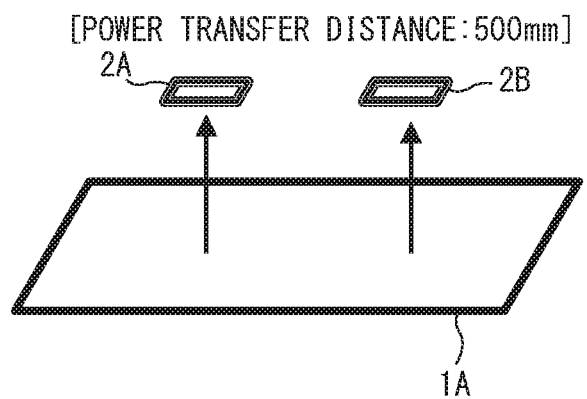
FIG. 11A is a diagram (4) for illustrating one example of the three-dimensional wireless power transfer control method for a plurality of power receivers.
Figure 11B:
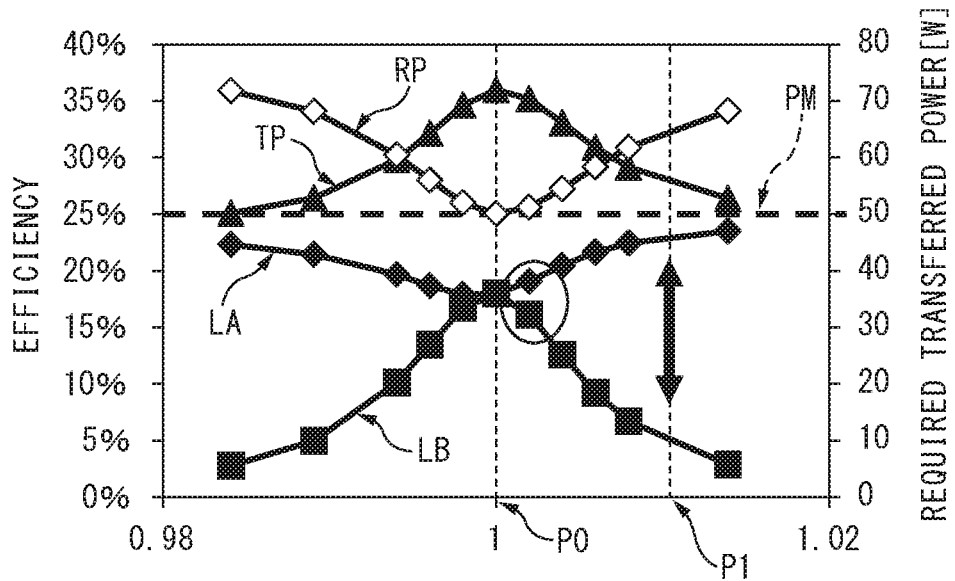
FIG. 11B is a diagram (5) for illustrating one example of the three-dimensional wireless power transfer control method for a plurality of power receivers.

FIG. 10A to FIG. 10C depict the case where the distance from the power source 1A to the two power receivers 2A and 2B is 300 mm, and FIG. 11A to FIG. 11C depict the case where the distance from the power source 1A to the two power receivers 2A and 2B is 500 mm.

Referring to FIGS. 10B and 11B, reference sign LA denotes the power reception efficiency of the power receiver 2A; LB, the power reception efficiency of the power receiver 2B; PM, the transferred power (maximum power transfer output) that may be output from the power source 1A; RP, the required transferred power; and TP, the overall power reception efficiency (overall efficiency).

Further, reference sign P0 denotes the case of power transfer at a ratio between the power requirements of the power receivers 2A and 2B of 1:1 (9 W:9 W); and P1, the case of power transfer at a ratio between the power requirements of the power receivers 2A and 2B of 2:1 (12 W:6 W). FIG. 10B and FIG. 11B are diagrams upon normalization assuming that the power ratio of 1:1 is "1.00."

In other words, assuming that the power transferred to the two power receivers 2A and 2B is 18 W, the case where the power requirements of both the power receivers 2A and 2B are 9 W and that where the power requirement of the power receiver 2A is 12 W and the power requirement of the power receiver 2B is 6 W will be considered hereinafter. The maximum power transfer output of the power source 1A is assumed to be limited to 50 W in accordance with, for example, the specifications of the power source or regulations stipulated in the Radio Law.

The case where the distance from the power source 1A to the two power receivers 2A and 2B is 300 mm (they are relatively close to each other) will be considered below with reference to FIG. 10A to FIG. 10C. First, when the power requirements of both the power receivers 2A and 2B to be simultaneously supplied with power are 9 W, i.e., when power transfer at a power ratio of 1:1 (9 W:9 W) is performed, the power reception efficiencies of both the power receivers 2A and 2B are assumed to be, for example, 30.1% (the overall efficiency (TP) is assumed to be 60.2%).

Then, as depicted in P0 of FIG. 10B and FIG. 10C, setting the power transfer output of the power source 1A to 29.9 W allows each of the power receivers 2A and 2B to receive a power of 29.9×0.301≈9 W.

When the power requirement of the power receiver 2A is 12 W and the power requirement of the power receiver 2B is 6 W, i.e., when power transfer at a power ratio of 2:1 (12 W:6 W) is performed, the resonance point of the power receiver resonance coil of the power receiver 2B is shifted, as described with reference to FIG. 9A and FIG. 9B.

In other words, power is simultaneously supplied to the power receivers 2A and 2B by shifting the resonance point of the power receiver resonance coil of the power receiver 2B to control the power distribution ratio to lower the power reception efficiency of the power receiver 2B (raise the power reception efficiency of the power receiver 2A).

Specifically, as depicted in P1 of FIG. 10B and FIG. 10C, the resonance point of the power receiver resonance coil of the power receiver 2B is shifted to set the power reception efficiency of the power receiver 2A to 39.5% and the power reception efficiency of the power receiver 2B to 19.7%. At this time, the overall efficiency (TP) is 59.2%.

As depicted in FIG. 10C, setting the power transfer output of the power source 1A to 30.4 W allows the power receiver 2A to receive a power of 30.4×0.395≈12 W and the power receiver 2B to receive a power of 30.4×0.197≈6 W.

When the distance from the power source 1A to the two power receivers 2A and 2B is 300 mm, the required transferred power RP of the power source 1A is lower than a maximum power transfer output of 50 W for both power transfer at a power ratio of 1:1 (29.9 W) and power transfer at a power ratio of 2:1 (30.4 W).

In addition, the overall efficiency TP stays nearly constant for power transfer at a power ratio of 1:1 (60.2%) and power transfer at a power ratio of 2:1 (59.2%). Therefore, when the distance from the power source 1A to the two power receivers 2A and 2B is 300 mm (they are relatively close to each other), both power transfer at a power ratio of 1:1 and power transfer at a power ratio of 2:1 may be implemented by simultaneous power supply.

The case where the distance from the power source 1A to the two power receivers 2A and 2B is 500 mm (they are relatively distant from each other) will be considered next with reference to FIG. 11A to FIG. 11C. First, when the power requirements of both the power receivers 2A and 2B to be simultaneously supplied with power are 9 W, i.e., when power transfer at a power ratio of 1:1 (9 W:9 W) is performed, the power reception efficiencies of both the power receivers 2A and 2B are assumed to be, for example, 18.2% (the overall efficiency (TP) is assumed to be 36.4%).

Then, as depicted in P0 of FIG. 11B and FIG. 11C, setting the power transfer output of the power source 1A to 49.5 W allows each of the power receivers 2A and 2B to receive a power of 49.5×0.182≈9 W. In this case, the required transferred power RP (49.5 W) of the power source 1A is lower than a maximum power transfer output of 50 W, power may be simultaneously supplied to the power receivers 2A and 2B.

When the power requirement of the power receiver 2A is 12 W and the power requirement of the power receiver 2B is 6 W (the power ratio is 2:1), the resonance point of the power receiver resonance coil of the power receiver 2B is shifted to control the power distribution ratio to lower the power reception efficiency of the power receiver 2B (raise the power reception efficiency of the power receiver 2A), as described above.

Specifically, as depicted in P1 of FIG. 11B and FIG. 11C, the resonance point of the power receiver resonance coil of the power receiver 2B is shifted to set the power reception efficiency of the power receiver 2A to 21.2% and the power reception efficiency of the power receiver 2B to 10.6%. At this time, the overall efficiency (TP) is 31.8%.

However, to set the power received by the power receiver 2A to 12 W (≈56.6×0.212), the required transferred power RP of the power source 1A is set to 56.6 W, which is higher than a maximum power transfer output of 50 W. It is therefore difficult to simultaneously supply power to the two power receivers 2A and 2B.

When the power transfer output of the power source 1A is not limited to 50 W in accordance with, for example, the specifications of the power source or regulations stipulated in the Radio Law, the power source 1A may preferably have its power transfer output increased to tolerate a required transferred power RP of 56.6 W.

Further, when simultaneous power supply involves a required transferred power RP of 56.6 W, which is higher than the maximum power transfer output (50 W), time-division power transfer (time-division power supply) in which power is sequentially transferred to the power receivers 2A and 2B by time-division switching is performed.

Assume herein that the power reception efficiency is 25% when power is transferred (power is supplied) by the power source 1A to either the power receiver 2A or 2B in time-division power supply. Then, the power received by the power receiver 2A may be set to 12 W (=48×0.25) by setting the power transfer output of the power source 1A to 48 W and supplying power to only the power receiver 2A. Further, the power received by the power receiver 2B may be set to 6 W (=24×0.25) by setting the power transfer output of the power source 1A to 24 W and supplying power to only the power receiver 2B.

Therefore, when the distance from the power source 1A to the two power receivers 2A and 2B is 500 mm (they are relatively distant from each other), simultaneous power supply may be preferably used for power transfer at a power ratio of 1:1 while time-division power supply is preferably used (simultaneous power supply is impossible) for power transfer at a power ratio of 2:1.

As described above, for example, when the distance from the power source 1A to the two power receivers 2A and 2B is 300 mm, the overall efficiency stays nearly constant even upon power distribution adjustment, and even simultaneous power supply is possible at a power ratio of 2:1 (N:1) for a received power which allows power transfer at a power ratio of 1:1.

In contrast to this, for example, when the distance from the power source 1A to the two power receivers 2A and 2B is 500 mm, the overall efficiency lowers upon power distribution adjustment, and it becomes difficult to perform power transfer at a power ratio of N:1 or the maximum power transfer output of the power source may be preferably increased. When such simultaneous power supply is difficult, time-division power supply is performed.

In other words, in a wireless power transfer system including a plurality of power receivers, no evaluation index for determining whether to perform simultaneous power supply or time-division power supply to each power receiver is set and it is therefore difficult to perform appropriate power supply (wireless power transfer) to each power receiver.

Even a criterion for determining whether simultaneous power supply to a plurality of power receivers is possible is unclear. Although simulation or test power transfer, for example, may be conducted, it is difficult to apply them in practice because, for example, the number of combinations that increases in proportion to the number of power receivers is enormous.

An embodiment of a wireless power transfer control method and a wireless power transfer system will be described in detail below with reference to the accompanying drawings. The present embodiment is applicable to a wireless power transfer system which uses at least one power source to wirelessly transfer power to a plurality of power receivers.

Although the following description mainly takes as an example the case where one power source wirelessly transfers power to a plurality of (two to five) power receivers using magnetic field resonance, power transfer may be performed by two or more power sources, as described with reference to FIG. 7A to FIG. 7C, in the present embodiment. Further, the present embodiment is similarly applicable to a wireless power transfer system which uses electric field resonance instead of magnetic field resonance.

In the wireless power transfer control method and the wireless power transfer system of the present embodiment, kQ (kQ value) is employed as an evaluation index for wireless power transfer (wireless power supply). Note that k (k value) indicates the degree of coupling of electromagnetic fields, and the larger the k value, the higher the degree of coupling. Q (Q value) indicates the degree of loss of an electromagnetic field, and the larger the Q value, the lower the degree of loss.

In other words, kQ is given by:

$$kQ = k\sqrt{Qt \cdot Qr} \qquad (1)$$

where Qt is the Q value of the power source and Qr is the Q value of the power receiver.

k is given by:

$$k = \sqrt{\frac{Mtr}{Lt \cdot Lr}} \qquad (2)$$

where Mtr is the mutual inductance between the power source and the power receiver, Lt is the self-inductance of the power source, and Lr is the self-inductance of the power receiver.

Q is given by:

$$Qt = \frac{\omega Lt}{Rt}, Qr = \frac{\omega Lr}{Rr} \qquad (3)$$

where ω is the angular frequency, Rt is the loss of the resonance coil of the power source, and Rr is the loss of the resonance coil of the power receiver.

Figure 12:
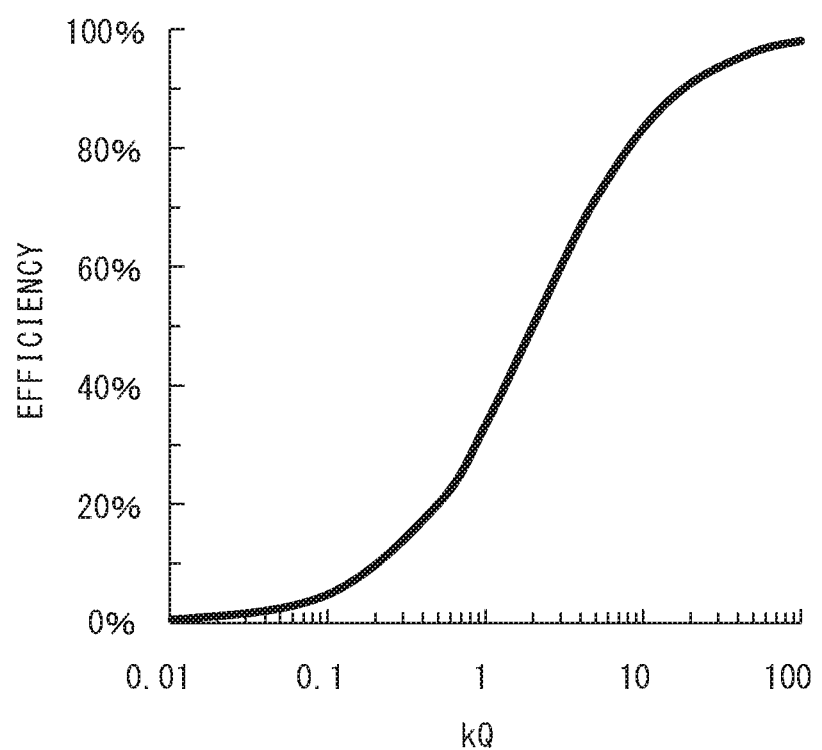
FIG. 12 is a diagram for illustrating an evaluation index in the wireless power transfer control method of the present embodiment.

FIG. 12 is a diagram for illustrating an evaluation index in the wireless power transfer control method of the present embodiment and depicts the relationship between the kQ value (the product of k and Q) and the ideal efficiency in one power source and one power receiver.

FIG. 12 represents the kQ value on the abscissa and the efficiency on the ordinate. In other words, in the present embodiment, the kQ value for one power source and one power receiver exhibiting characteristics as depicted in FIG. 12, for example, is applied to power transfer to at least one power source and at least two (a plurality of) power receivers.

The wireless power transfer control method and the wireless power transfer (wireless power supply) system of the present embodiment use a kQ value as an evaluation index to determine whether power is transferred from at least one power source to a plurality of power receivers by simultaneous power supply or time-division power supply.

In, for example, designing a wireless power supply system, a kQ value is possible as an index for determining the power transfer efficiency. Note that, as depicted in FIG. 12, in, for example, wireless power supply at Power Transfer: Power Reception=1:1, the efficiency and the kQ value hold a given theoretical relationship so that a theoretical maximum efficiency may be estimated by evaluating the kQ value.

The wireless power transfer control method of the present embodiment uses a kQ value as an evaluation index to determine whether time-division power transfer or simultaneous power transfer is preferably employed.

FIG. 13A to FIG. 14B are diagrams for illustrating a first embodiment of a wireless power transfer control method and illustrates a wireless power transfer control method in a three-dimensional wireless power transfer system of the first embodiment.

For the sake of simplicity, although FIG. 13A to FIG. 14B depict only one power source 1A and two power receivers 2A and 2B, the same applies when a plurality of power sources and three or more power receivers are used.

Figure 13A:
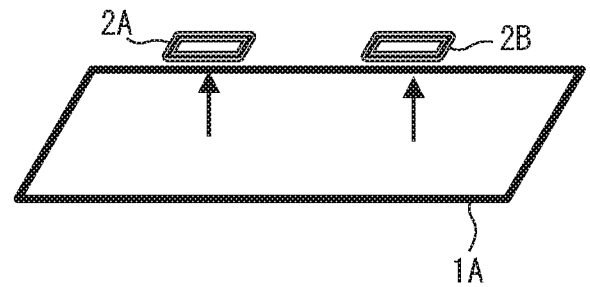
FIG. 13A is a diagram (1) for illustrating a first embodiment of a wireless power transfer control method.
Figure 13B:
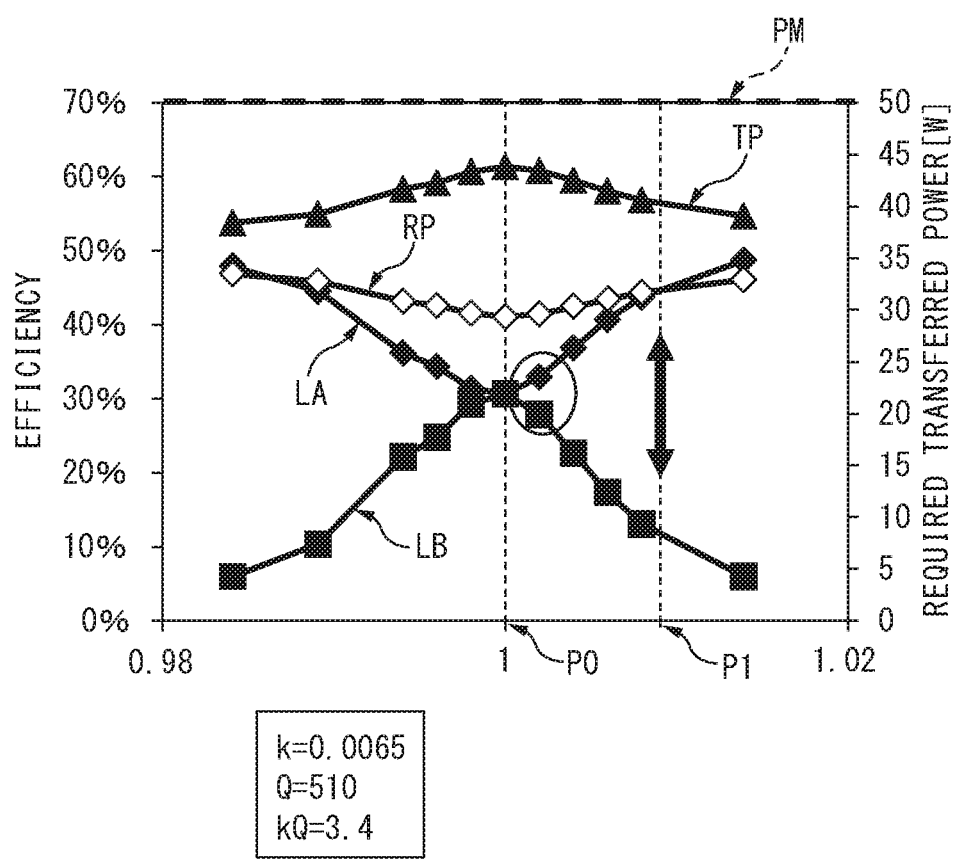
FIG. 13B is a diagram (2) for illustrating the first embodiment of the wireless power transfer control method.
Figure 14A:
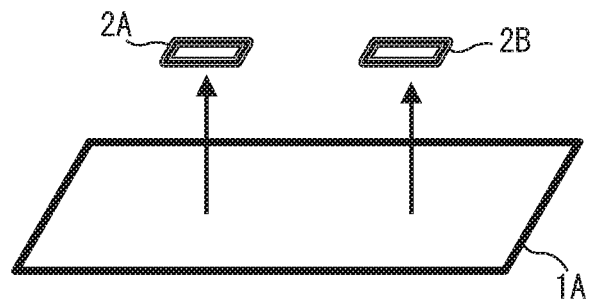
FIG. 14A is a diagram (3) for illustrating the first embodiment of the wireless power transfer control method.
Figure 14B:
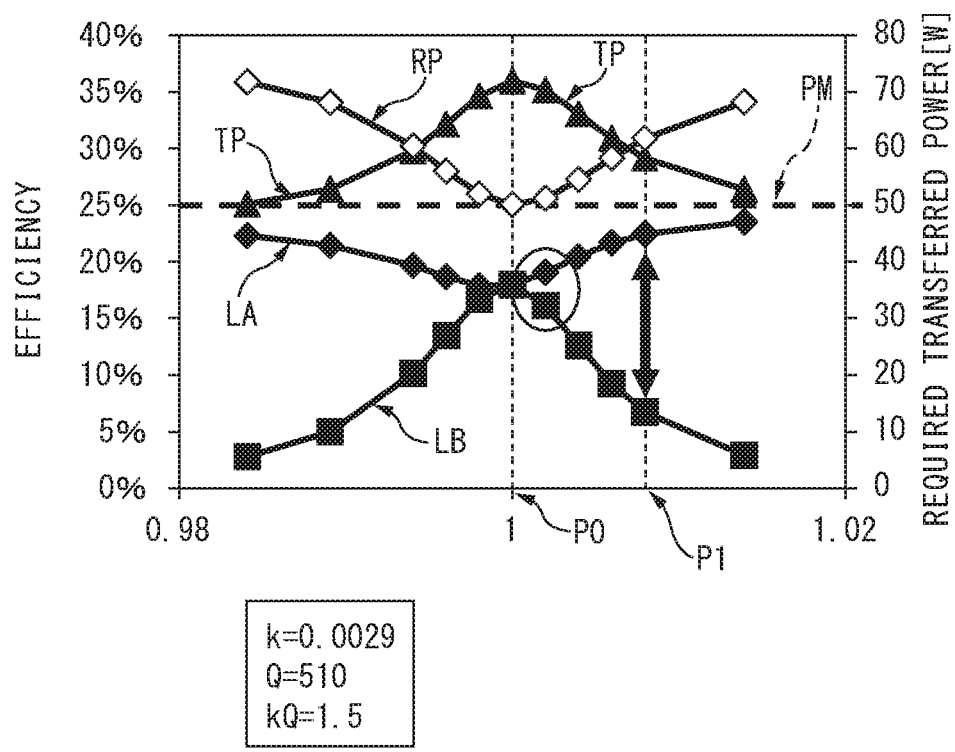
FIG. 14B is a diagram (4) for illustrating the first embodiment of the wireless power transfer control method.

FIG. 13A and FIG. 13B depict the case where the distance from the power source 1A to the two power receivers 2A and 2B is 300 mm and correspond to FIG. 10A and FIG. 10B mentioned earlier. FIG. 14A and FIG. 14B depict the case where the distance from the power source 1A to the two power receivers 2A and 2B is 500 mm and correspond to FIG. 11A and FIG. 11B mentioned earlier.

Referring to FIG. 13B and FIG. 14B, reference sign LA denotes the power reception efficiency of the power receiver 2A; LB, the power reception efficiency of the power receiver 2B; PM, the maximum power transfer output of the power source 1A; RP, the required transferred power; and TP, the overall efficiency.

Further, reference sign P0 denotes the case of power transfer at a ratio between the power requirements of the power receivers 2A and 2B of 1:1 (9 W:9 W); and P1, the case of power transfer at a ratio between the power requirements of the power receivers 2A and 2B of 2:1 (12 W:6 W). FIG. 13B and FIG. 14B are diagrams upon normalization assuming that the power ratio of 1:1 is "1.00."

Since FIG. 13A and FIG. 13B correspond to FIG. 10A and FIG. 10B mentioned earlier and FIG. 14A and FIG. 14B correspond to FIG. 11A and FIG. 11B mentioned earlier, a repetitive description thereof will not be given herein.

First, as depicted in FIG. 13A and FIG. 13B, when the distance from the power source 1A to the two power receivers 2A and 2B is 300 mm, the k and Q values are k=0.0065 and Q=510. In this case, a kQ value may be obtained as kQ=0.0065×510=3.4.

Next, as depicted in FIG. 14A and FIG. 14B, when the distance from the power source 1A to the two power receivers 2A and 2B is 500 mm, the k and Q values are k=0.0029 and Q=510.

In other words, since the distance from the power source 1A to the power receivers 2A and 2B becomes longer from 300 mm to 500 mm, the degree of coupling of magnetic fields (electromagnetic fields) is low and the k value reduces from 0.0065 to 0.0029. The Q value remains at 510 because the degree of loss of a magnetic field (electromagnetic field) remains the same.

Accordingly, as depicted in FIG. 14A and FIG. 14B, when the distance from the power source 1A to the two power receivers 2A and 2B is 500 mm, a kQ value may be obtained as kQ=0.0029×510=1.5.

For example, upon setting the threshold for the kQ value to "2.0," when the kQ value is equal to or larger than the threshold (kQ≥2.0), simultaneous power supply (simultaneous power transfer mode) is selected, and when the kQ value is smaller than the threshold (kQ<2.0), time-division power supply (time-division power transfer mode) is selected. In this manner, according to the present first embodiment, appropriate wireless power transfer may be performed by switching between time-division power transfer and simultaneous power transfer to the plurality of power receivers 2A and 2B.

Note that a threshold for the kQ value around, for example, "2.0" defines the difference between the case where the overall efficiency lowers upon power distribution ratio adjustment by changing the resonance condition and that where the overall efficiency remains the same even upon such adjustment. Although the threshold for the kQ value is set to "2.0" in the above description, it is actually set in consideration of the power requirement, efficiency, convenience, and the like of each product (power receiver). However, considering that the efficiency can be maintained even upon power distribution, the threshold for the kQ value may be set preferably within the range of 0.1 to 10 and more preferably within the range of 0.5 to 5.

Using this result, when the kQ value is equal to or larger than the threshold, simultaneous power supply may be performed while performing power distribution adjustment, or when the kQ value is smaller than the threshold, time-division power supply is performed instead of simultaneous power supply, because the overall efficiency lowers upon power distribution ratio adjustment.

Figure 15A:
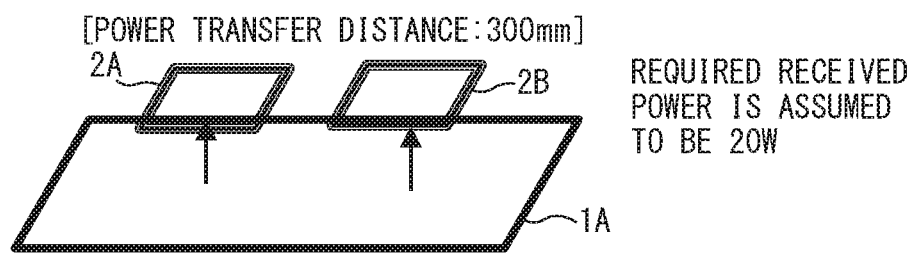
FIG. 15A is a diagram (1) for illustrating a second embodiment of a wireless power transfer control method.
Figure 15B:
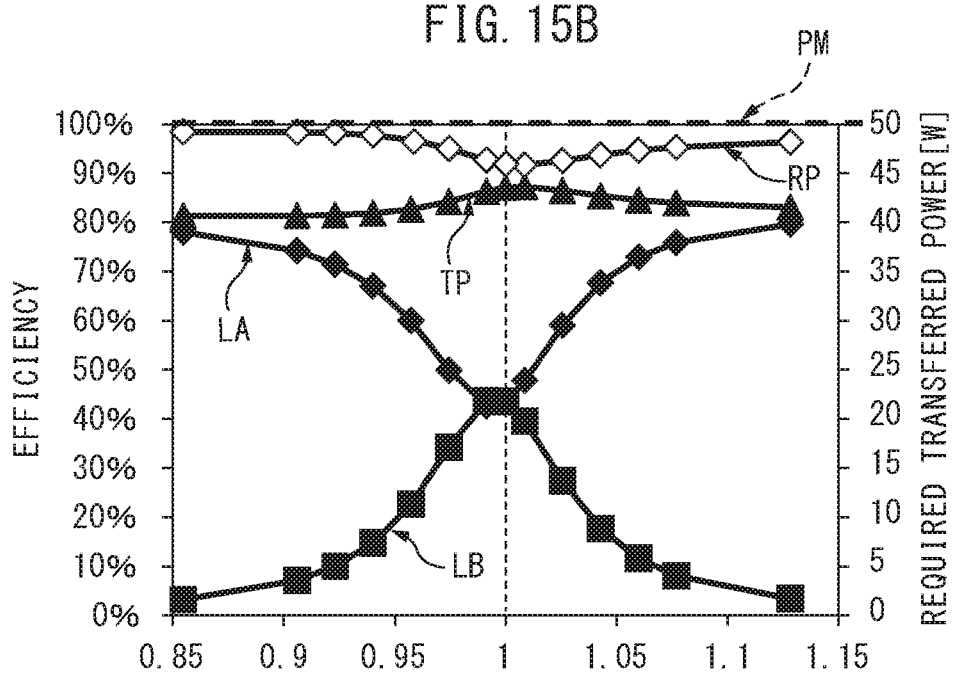
FIG. 15B is a diagram (2) for illustrating the second embodiment of the wireless power transfer control method.
Figure 16A:
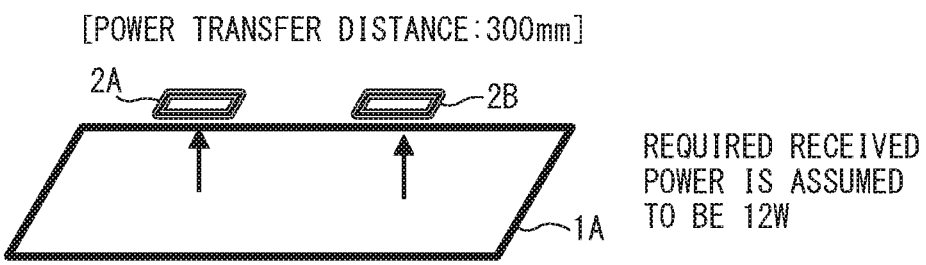
FIG. 16A is a diagram (3) for illustrating the second embodiment of the wireless power transfer control method.
Figure 16B:
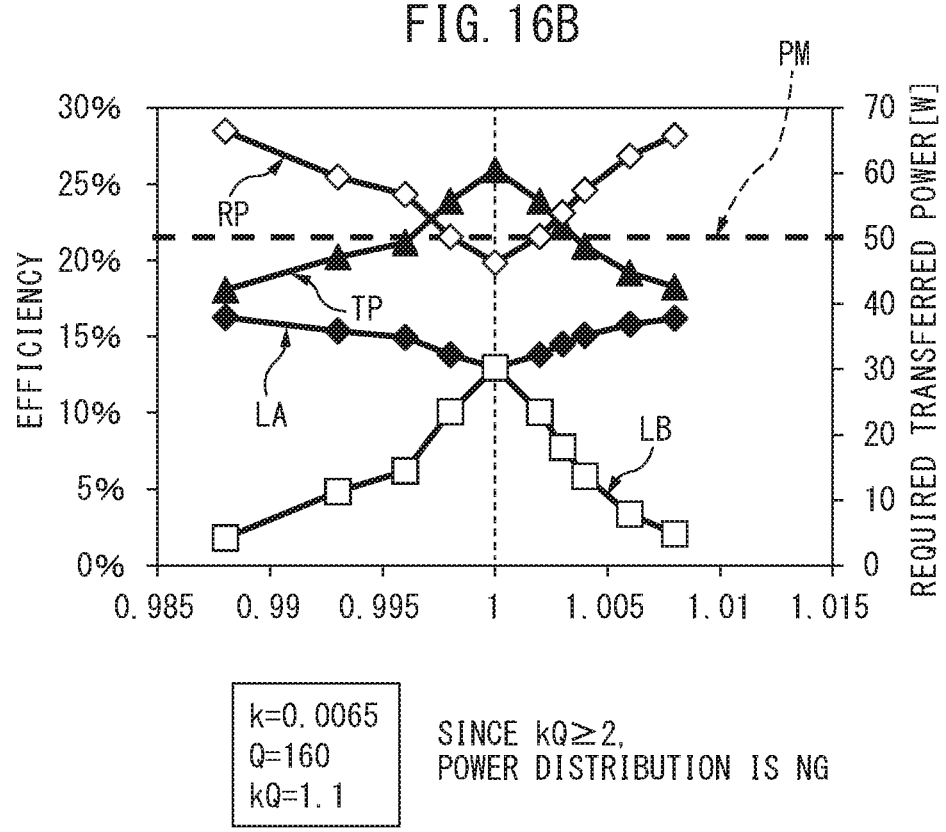
FIG. 16B is a diagram (4) for illustrating the second embodiment of the wireless power transfer control method.

FIG. 15A to FIG. 16B are diagrams for illustrating a second embodiment of a wireless power transfer control method. Both FIG. 15A and FIG. 15B and FIG. 16A and FIG. 16B depict the case where the distance from the power source 1A to the two power receivers 2A and 2B is 300 mm, while using different Q values. FIG. 15B and FIG. 16B are diagrams upon normalization assuming that the power ratio of 1:1 is "1.00."

First, referring to FIG. 15A and FIG. 15B, the self-inductances (Lr) of the power receiver resonance coils in the power receivers 2A and 2B are high, and the k and Q values are k=0.026 and Q=600. In this case, a kQ value may be obtained as kQ=0.026×600=15.3. Since kQ=15.3≥2.0, simultaneous power supply (simultaneous power transfer mode) is selected.

Referring to FIG. 16A and FIG. 16B, the self-inductances (Lr) of the power receiver resonance coils in the power receivers 2A and 2B are low, and the k and Q values are k=0.0065 and Q=160. In this case, a kQ value may be obtained as kQ=0.0065×160=1.1. Since kQ=1.1<2.0, time-division power supply (time-division power transfer mode) is selected.

In this manner, with the wireless power transfer control method (the wireless power transfer system) of the present embodiment, wireless power supply may be performed by, for example, setting a kQ value as an evaluation index to determine whether simultaneous power supply or time-division power supply is appropriate.

The k value may be calculated on the basis of, for example, the specification information defined between the power source 1A and the power receiver 2A (2B) and the relative positional relationship between the power source 1A and the power receiver 2A (2B), and the Q value is pre-defined by each power receiver.

Figure 17:
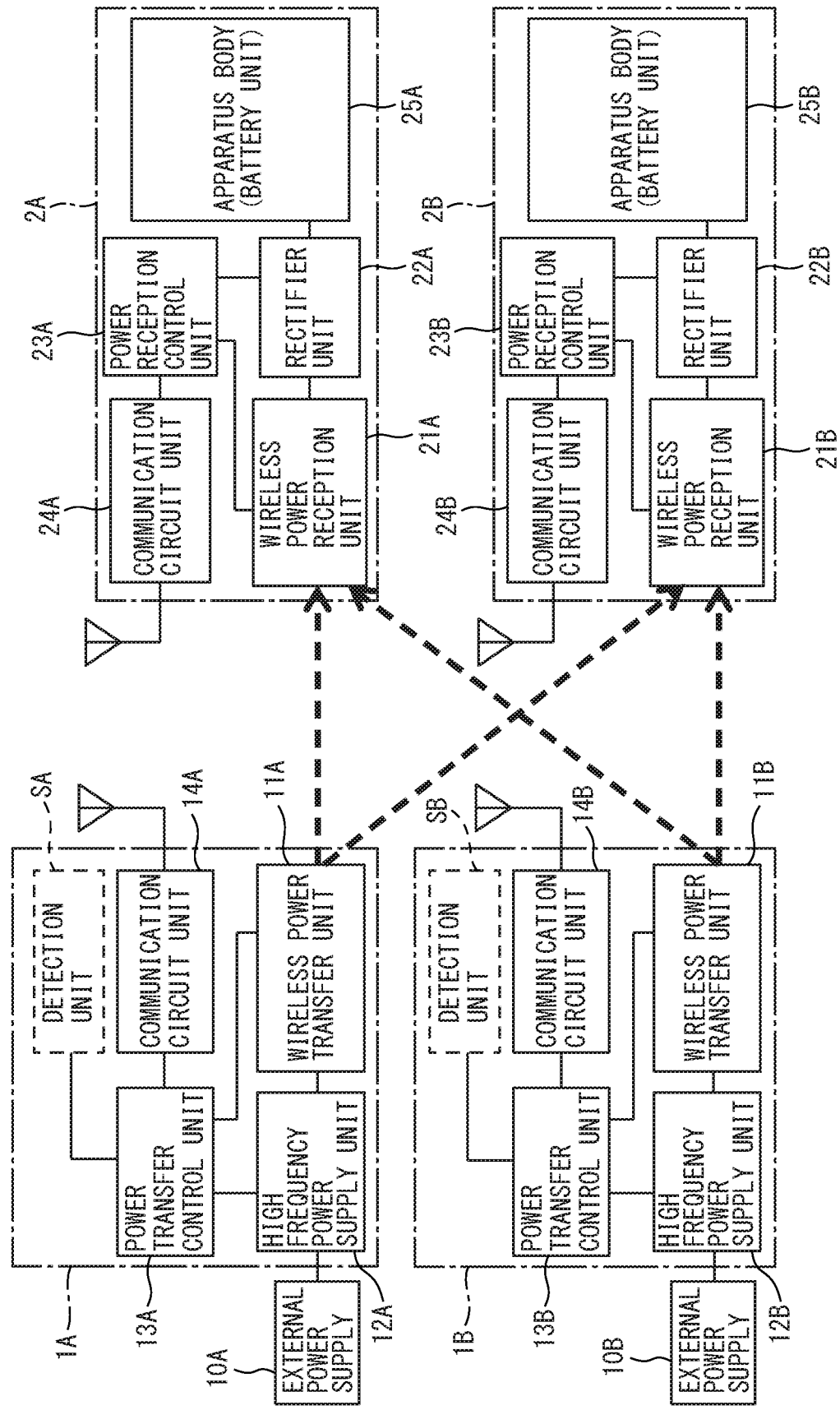
FIG. 17 is a block diagram depicting one example of a wireless power transfer system of the present embodiment.

FIG. 17 is a block diagram depicting one example of a wireless power transfer system of the present embodiment and illustrates an example in which it includes two power sources 1A and 1B and two power receivers 2A and 2B. The power sources 1A and 1B have the same configuration and include wireless power transfer units 11A and 11B, high frequency power supply units 12A and 12B, power transfer control units 13A and 13B, and communication circuit units 14A and 14B, respectively, as depicted in FIG. 17.

The high frequency power supply units 12A and 12B generate high frequency power, correspond to, for example, the high frequency power supply unit 12 in FIG. 3 mentioned earlier, and have a unique power supply impedance. Examples of the high frequency power supply units 12A and 12B include a constant-voltage power supply with its output impedance matched to 50Ω and an Hi-ZΩ power supply (constant-current power supply) having a high output impedance.

The power transfer control units 13A and 13B control the power transfer units 11A and 11B, and the communication circuit units 14A and 14B enable communication between each power source and the power receivers and may use, for example, a DSSS wireless LAN system based on IEEE 802.11b or Bluetooth (registered trademark).

The high frequency power supply units 12A and 12B receive power supplied from the external power supplies 10A and 10B, respectively, and the power transfer control units 13A and 13B receive signals from detection units SA and SB, respectively. The power sources 1A and 1B may serve as, for example, two power transfer units (11) provided in one power source 1, as a matter of course.

The wireless power transfer units 11A and 11B correspond to coils for magnetic field resonance and convert high frequency power supplied from the high frequency power supply units 12A and 12B into a magnetic field. The detection units SA and SB detect the relative positional relationship between the power sources 1A and 1B and the relative positional relationship between the power receivers 2A and 2B.

When, for example, the positional relationship between the power sources 1A and 1B is fixed (power source resonance coils 11a1 and 11a2 are fixed in a specific L-block shape), information to that effect is received by the power transfer control units 13A and 13B, and the power receivers 2A and 2B have the detection function, the detection units SA and SB may be omitted.

The power receivers 2A and 2B have the same configuration and include wireless power reception units 21A and 21B, rectifier units (power reception circuit units) 22A and 22B, power reception control units 23A and 23B, communication circuit units 24A and 24B, and apparatus bodies (battery units) 25A and 25B, respectively.

The power reception control units 23A and 23B are used to control the power receivers 2A and 2B, and the communication circuit units 24A and 24B enable communication between each power source and the power receivers and use, for example, a wireless LAN system or Bluetooth (registered trademark), as described earlier.

The wireless power reception units 21A and 21B correspond to coils for magnetic field resonance and convert wirelessly transferred power into a current. The rectifier units 22A and 22B convert AC currents obtained from the wireless power reception units 21A and 21B into DC currents, which may thus be used in battery charging or in the apparatus bodies.

As described above, the power sources 1A and 1B and the power receivers 2A and 2B perform communication via their communication circuit units 14A, 14B, 24A, and 24B, respectively. At this time, for example, the power source 1A may even be used as a master (entire controller) so that the master (power source) 1A controls the other power source 1B and the power receivers 2A and 2B as slaves.

Switching between simultaneous power transfer and time-division power transfer, power distribution ratio adjustment in simultaneous power transfer, and the like are controlled by communication via the communication circuit units 14A and 14B of the power sources 1A and 1B and the communication circuit units 24A and 24B of the power receivers 2A and 2B.

Specifically, for example, Q values in the respective power receivers 2A and 2B are communicated to a master (e.g., the power source 1A) which controls wireless power transfer, via the communication circuit unit 14A of the power source 1A and the communication circuit units 24A and 24B of the power receivers 2A and 2B.

In simultaneous power supply, for example, the power distribution ratio is adjusted by shifting the capacitance ($C_A$) of the capacitor in the power receiver resonance coil of the power receiver 2B from the resonance point via the communication circuit unit 14A of the power source 1A and the communication circuit unit 24B of the power receiver 2B. Specifically, the value of the capacitance of a capacitor 212 in the power receiver resonance coil 21a depicted in FIG. 5A mentioned earlier is controlled to adjust the power distribution ratio between the power receivers 2A and 2B.

In time-division power supply, for example, power receivers which perform wireless power supply are switched via the communication circuit unit 14A of the power source 1A and the communication circuit units 24A and 24B of the power receivers 2A and 2B.

Specifically, for example, a switch 213 in the power receiver resonance coil 21a depicted in FIG. 5A mentioned earlier is controlled to perform control to sequentially turn on only switches 213 of power receivers which perform wireless power supply. Alternatively, for example, a switch 213 in the power receiver resonance coil 21a depicted in FIG. 5B mentioned earlier is controlled to perform control to sequentially turn off only switches 213 of power receivers which perform wireless power supply.

Note that power transfer between the wireless power transfer units 11A and 11B and the wireless power reception unit 21A or 21B is not limited to that which uses magnetic field resonance, and a power transfer scheme which uses electric field resonance, or electromagnetic induction or electric field induction, for example, is also applicable.

Figure 18:
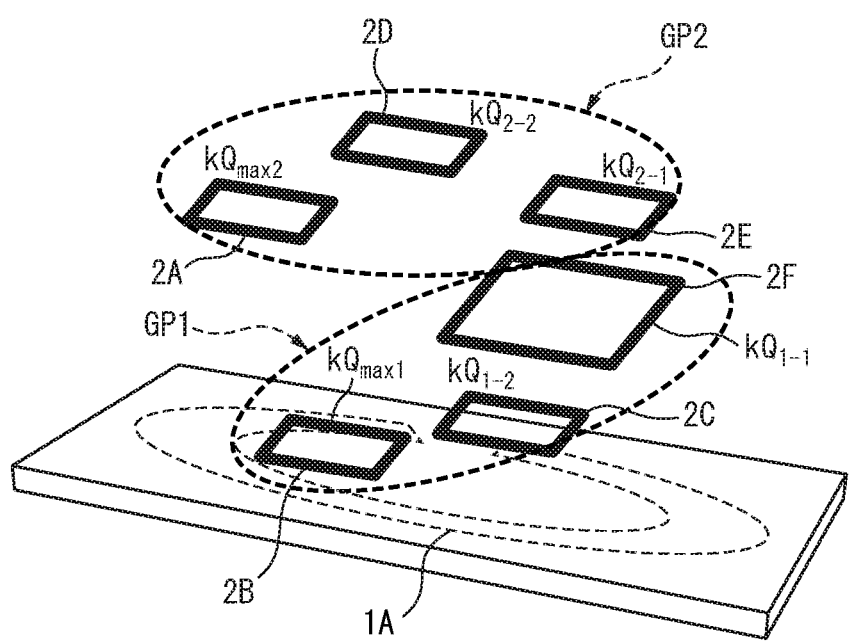
FIG. 18 is a diagram for illustrating a third embodiment of a wireless power transfer control method.

The case where kQ values are grouped when three or more power receivers are provided will be described below. FIG. 18 is a diagram for illustrating a third embodiment of a wireless power transfer control method and illustrates grouping of evaluation indices. Although FIG. 18 depicts one power source 1A and six power receivers 2A to 2F, this is merely an example, and various cases may occur, as a matter of course.

As depicted in FIG. 18, with the wireless power transfer control method of the third embodiment, the kQ values (evaluation indices) of a plurality of (six) power receivers 2A to 2F are evaluated and used for grouping. All the power receivers 2A to 2F are evaluated for each individual first.

When, for example, the power receiver 2A is evaluated, only the power receiver 2A is turned on and the remaining power receivers 2B to 2F are turned off (e.g., the switch 213 in the power receiver resonance coil 21a depicted in FIG. 5A is turned off). Then, for example, with reference to the power receiver 2B having a maximum kQ value ($kQ_{max1}$), power receivers whose $kQ_{other}/kQ_{max1}$ is equal to or larger than a predetermined value for the kQ values ($kQ_{other}$) of the remaining power receivers are determined to belong to the same group. Specifically, referring to FIG. 18, the power receiver 2F whose kQ value is $kQ_{1-1}$ and the power receiver 2C whose kQ value is $kQ_{1-2}$ are determined to belong to a first group GP1.

For the power receivers 2A, 2D, and 2E other than the first group GP1 including the power receiver 2B having a maximum kQ value ($kQ_{max1}$) grouping is similarly performed with reference to the power receiver 2A having a maximum kQ value ($kQ_{max2}$). Specifically, referring to FIG. 18, the power receivers 2A, 2D, and 2E are determined to belong to a second group GP2. Simultaneous power supply, for example, is performed in the same group for each of the divided groups GP1 and GP2, while how power is supplied is individually determined across different groups, as will be described later.

In general, the power and the efficiency preferably hold a proportional relationship as a requirement of a system capable of wireless power transfer. In other words, a system which transfers high power desirably attains a high efficiency, while a system which transfers low power may have only a low efficiency. This may be easily understood especially in consideration of problems resulting from heat dissipation because losses result in heat generation.

In other words, when a high-power system has a low efficiency, the power to be dissipated is high and it is therefore difficult to construct a system. In other words, the allowable efficiency may be defined in accordance with the transferred power.

Under the circumstances, upon examining whether to perform simultaneous power supply or time-division power supply to a plurality of power receivers having different kQ values, simultaneous power supply may be always desirable when the power transfer completion time is prioritized, but the allowable efficiency varies in each individual system, as described above.

It is practical to devise a method which allows simultaneous power supply while maintaining a given allowable efficiency, and in the present embodiment, power receivers having close kQ values are grouped so that simultaneous power supply is prioritized within the obtained group while time-division power supply is prioritized for power receivers which fall outside this group.

For simultaneous power supply to power receivers having equal (close) kQ values, the power balance may be easily adjusted by slightly changing the Q value, whereas for simultaneous power supply to power receivers having significantly different kQ values, the Q value is considerably reduced for balance adjustment. This leads to degradation in overall efficiency.

Power supply to a notebook computer group and a smartphone group will be considered as one example. A notebook computer group (notebook computers), for example, requires power supply at 30 W (its power requirement is 30 W) and has an allowable minimum efficiency of 80% due to its high power. Since notebook computers have a large size, large power receiver coils may be used and the kQ values may be set large.

A smartphone group (smartphones), for example, requires power supply at 5 W (its power requirement is 5 W) and has an allowable efficiency of 40%. Since smartphones have a small size and are freer to locate, the kQ values are kept small.

Upon simultaneous power supply to such two groups, power is simultaneously supplied to groups having different kQ values, but in fact power is supplied to only the notebook computer group and no power reaches the smartphone group.

In this case, for example, the power balance may be adjusted by reducing the Q values, but then the overall efficiency lowers, and the efficiency of power supply including that for notebook computers, in turn, lowers, and this may degrade the allowable efficiency even to, for example, 80% or less.

This reveals that simultaneous power supply to groups having different kQ values is not preferable. In other words, when three or more power receivers have kQ values (evaluation indices) equal to or larger than a set value, they are grouped on the basis of the kQ values and preferably grouped such that power receivers having close kQ values belong to the same group.

Regarding the power receivers grouped on the basis of the kQ values, for example, power receivers in a group equal to or less than a threshold undergo time-division power supply. For power receivers in a group equal to or more than a threshold, it is preferable to allow simultaneous power supply by adjusting the power distribution in power supply within the same group, while performing time-division power supply to power receivers across different groups.

The threshold for classifying a plurality of power receivers into a plurality of groups on the basis of the kQ values may be varied in accordance with the scales and specifications of assumed wireless power transfer systems, and the numbers of groups and power receivers included in each group, in turn, change.

Figure 19:
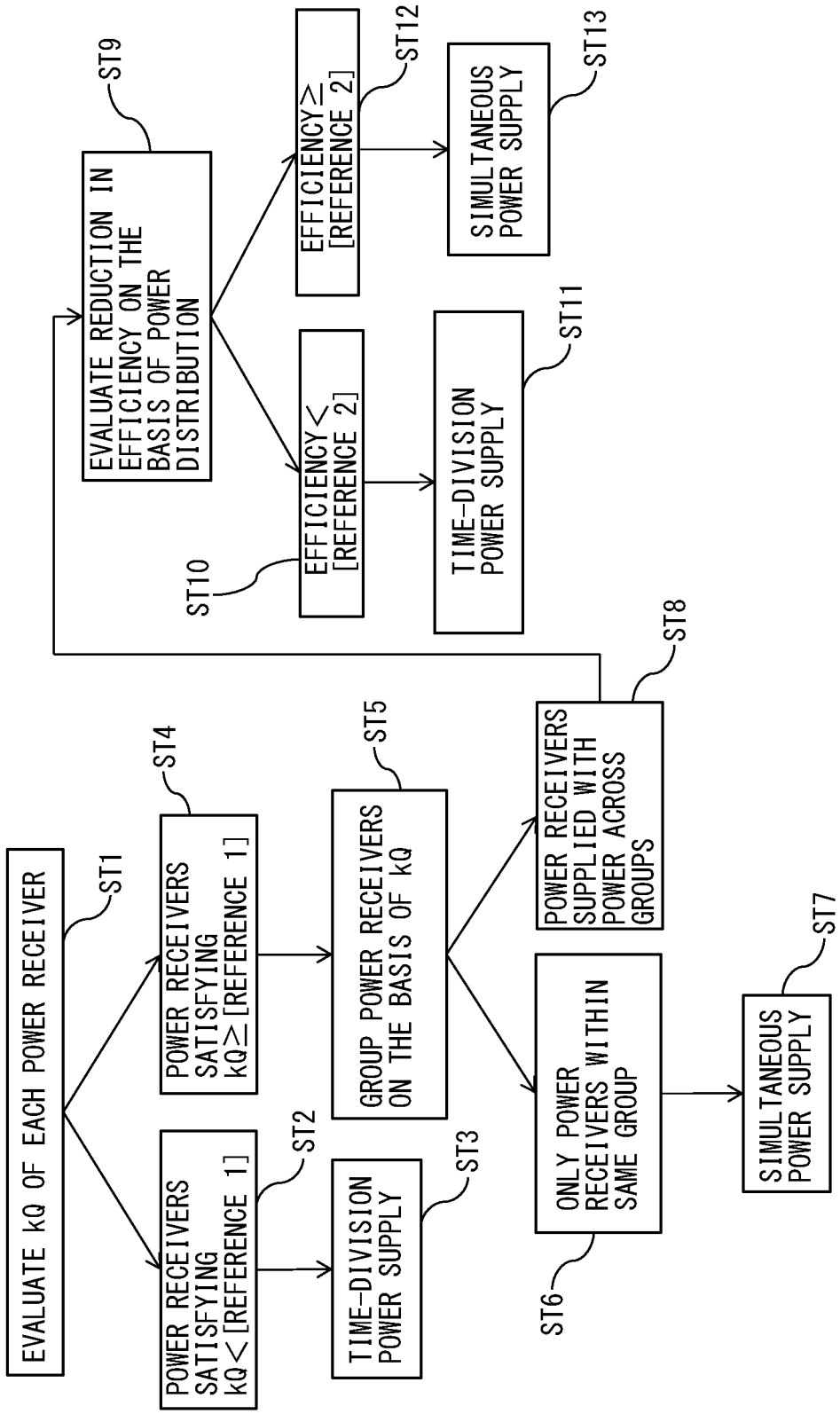
FIG. 19 is a flowchart for illustrating one example of processing based on the wireless power transfer control method of the third embodiment.

FIG. 19 is a flowchart for illustrating one example of processing based on the wireless power transfer control method of the third embodiment. As depicted in FIG. 19, when processing based on the wireless power transfer control method of the third embodiment is started, in step ST1 the kQ value of each power receiver is evaluated, and for power receivers determined to satisfy kQ<[Reference 1 (First Set Value)] (step ST2), the process advances to step ST3, in which time-division power supply is performed.

For power receivers determined to satisfy kQ≥[Reference 1] (step ST4), the process advances to step ST5, in which the power receivers are grouped on the basis of the kQ values. For only power receivers within the same group (step ST6), the process advances to step ST7, in which simultaneous power supply is performed.

For power receivers supplied with power across groups (step ST8), the process advances to step ST9, in which the reduction in efficiency upon power distribution is evaluated.

For power receivers determined to satisfy Efficiency (Expected Efficiency)<[Reference 2 (Second Set Value)] (step ST10), the process advances to step ST11, in which time-division power supply is performed. For power receivers determined to satisfy Efficiency≥[Reference 2] (step ST12), the process advances to step ST13, in which simultaneous power supply is performed.

Figure 20:
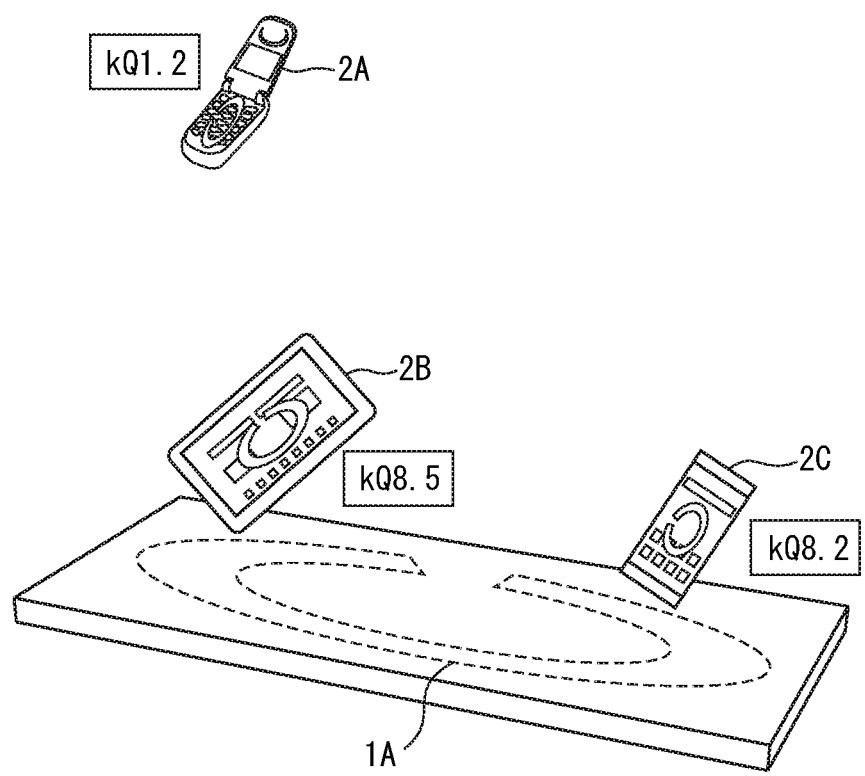
FIG. 20 is a diagram (1) for illustrating a plurality of power receivers corresponding to the processing in the flowchart depicted in FIG. 19.
Figure 21:
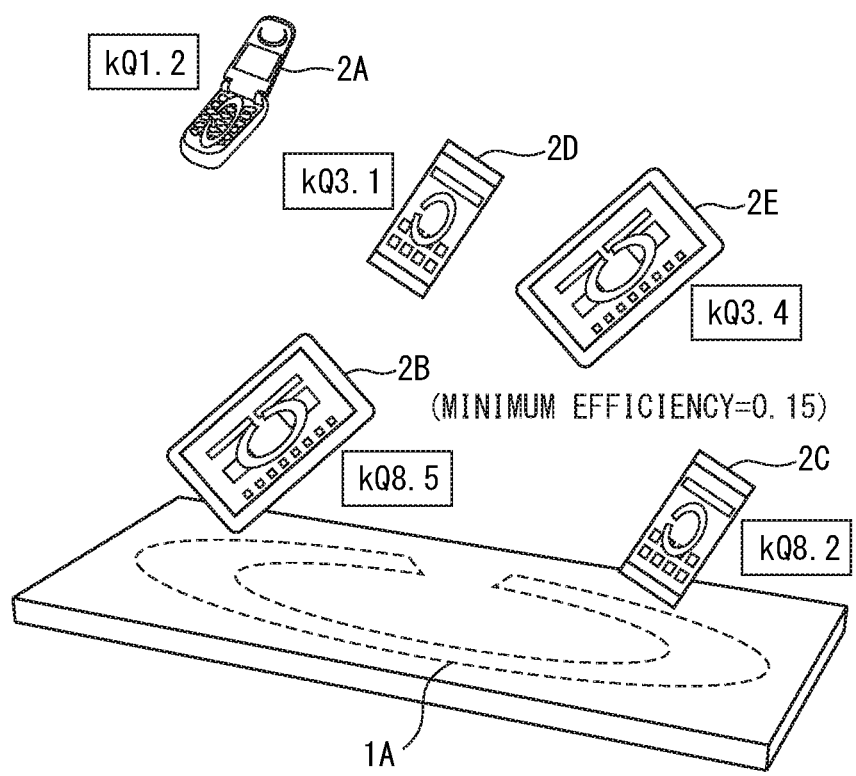
FIG. 21 is a diagram (2) for illustrating the plurality of power receivers corresponding to the processing in the flowchart depicted in FIG. 19.
Figure 22:
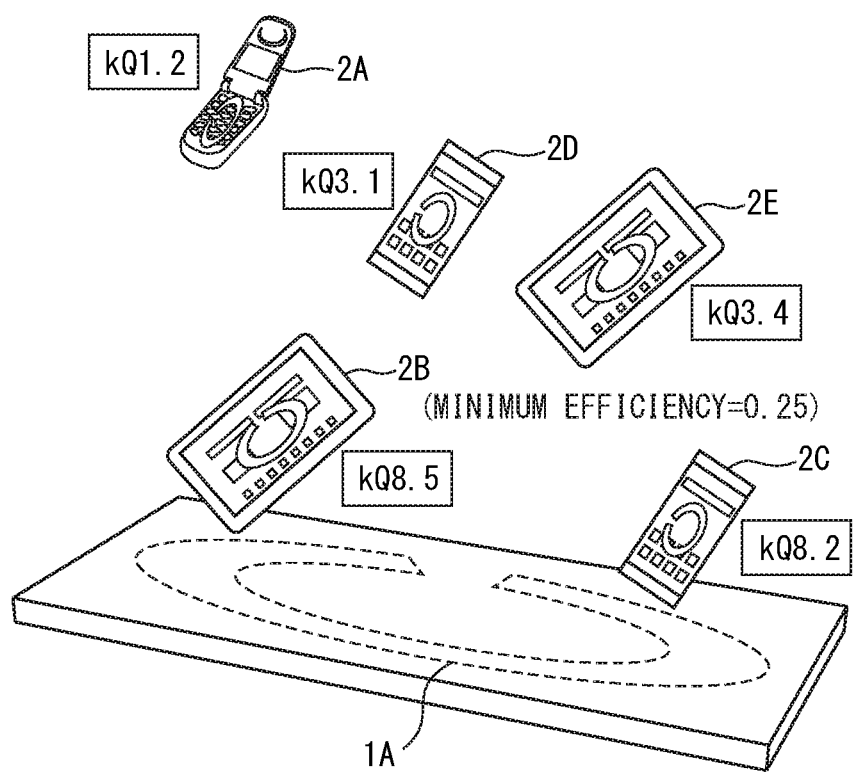
FIG. 22 is a diagram (3) for illustrating the plurality of power receivers corresponding to the processing in the flowchart depicted in FIG. 19.

FIG. 20 to FIG. 22 are diagrams for illustrating a plurality of power receivers corresponding to the processing in the flowchart depicted in FIG. 19. In steps ST2 and ST4 of the above-mentioned flowchart, [Reference 1 (kQ Reference 1:First Set Value)]=1.5 to determine the kQ value is set, and in steps ST10 and ST12, [Reference 2 (Determination Reference 2:Second Set Value)]=0.2 to determine the efficiency is set.

For example, the case where three power receivers (2A to 2C) are used, as depicted in FIG. 20, will be described first. Assume herein that the power receiver 2A has a kQ value of 1.2, the power receiver 2B has a kQ value of 8.5, and the power receiver 2C has a kQ value of 8.2.

Then, since the power receiver 2A satisfies kQ Value (1.2)<kQ Reference 1 (1.5), the process advances to step ST3, in which the power receiver 2A is determined not to be targeted for simultaneous power supply to a plurality of power receivers, and time-division power supply is selected for the power receiver 2A. On the other hand, since the power receivers 2B and 2C satisfy kQ Values (8.5, 8.2)≥kQ Reference 1 (1.5), the process advances to step ST5. In other words, the power receivers 2B and 2C are determined as candidates for simultaneous power supply.

In step ST6, the power receivers 2B and 2C may be determined to belong to the same group by grouping the kQ values. In other words, the power receivers 2B and 2C that are candidates for simultaneous power supply are determined to be only those within the same group and the process advances to step ST7, in which simultaneous power supply is performed. At this time, for example, the resonance points of the power receiver resonance coils of the power receivers 2B and 2C may be shifted on the basis of their power requirements to perform power distribution.

In this manner, in the case of FIG. 20, for example, time-division power supply is performed by time-division switching between a first power supply set in which the power receiver 2A is solely supplied with power and a second power supply set in which the power receivers 2B and 2C are simultaneously supplied with power.

In power supply by time-division switching, for example, a second power supply set may be performed after the completion of a first power supply set, but a second power supply set may be performed for a predetermined time after a first power supply set for a predetermined time and this processing may be alternately repeated.

For example, the case where five power receivers (2A to 2E) are used, as depicted in FIG. 21, will be described next. Assume herein that the power receiver 2A has a kQ value of 1.2, the power receiver 2B has a kQ value of 8.5, the power receiver 2C has a kQ value of 8.2, the power receiver 2D has a kQ value of 3.1, and the power receiver 2E has a kQ value of 3.4.

Then, since the power receiver 2A satisfies kQ Value (1.2)<kQ Reference 1 (1.5), the process advances to step ST3, in which the power receiver 2A is determined not to be targeted for simultaneous power supply to a plurality of power receivers, and time-division power supply is selected for the power receiver 2A. On the other hand, since the power receivers 2B to 2E satisfy respective kQ Values (8.5, 8.2, 3.1, 3.4)≥kQ Reference 1 (1.5), the process advances to step ST5, in which they are grouped on the basis of the kQ values.

Upon the grouping based on the kQ values, for example, the power receivers 2B and 2C have kQ values of 8.5 and 8.2 and are therefore determined to belong to the same group, and the power receivers 2D and 2E have kQ values of 3.1 and 3.4 and are therefore determined to belong to the same group.

In other words, the process advances to step ST8, in which it is determined that a plurality of groups (two groups: a group of the power receivers 2B and 2C and a group of the power receivers 2D and 2E) of candidates for simultaneous power supply are present, and the process advances to step ST9, in which the reduction in efficiency upon power distribution is evaluated.

Specifically, the minimum efficiency when power is simultaneously supplied to a group of the power receivers 2B and 2C and a group of the power receivers 2D and 2E is evaluated. For example, when the minimum efficiency (the efficiency) is 0.15, since Efficiency (0.15)<Efficiency Reference 2 (Second Set Value: 0.2), it is determined in step ST10 that the reduction in power transfer efficiency falls outside the tolerance and the process advances to step ST11, in which time-division power supply is performed.

In this manner, in the case of FIG. 21, for example, time-division power supply is performed for the following three power supply sets. In other words, power is supplied by time-division switching between a first power supply set in which the power receiver 2A is solely supplied with power, a second power supply set in which the power receivers 2B and 2C are simultaneously supplied with power, and a third power supply set in which the power receivers 2D and 2E are simultaneously supplied with power.

FIG. 22 depicts the case where five power receivers (2A to 2E) are used, as in the above-mentioned case of FIG. 21, and the kQ values of the respective power receivers 2A to 2E are also common to those in FIG. 21. Note, however, that the minimum efficiency in FIG. 22 is 0.25, which is higher than 0.15 in FIG. 21. In the case of FIG. 22, the processes in steps ST1 to ST9 of the flowchart depicted in FIG. 19 are the same as in FIG. 21.

In other words, in step ST9, the reduction in efficiency upon power distribution is evaluated, and the minimum efficiency when power is simultaneously supplied to a group of the power receivers 2B and 2C and a group of the power receivers 2D and 2E is 0.25.

When the minimum efficiency (the efficiency) is 0.25, since Efficiency (0.25)≥Efficiency Reference 2 (Second Set Value: 0.2), it is determined in step ST12 that the reduction in power transfer efficiency falls within the tolerance and the process advances to step ST13, in which simultaneous power supply is performed. In simultaneous power supply, power distribution may be performed on the basis of the power requirement of each power receiver, as a matter of course.

In this manner, in the case of FIG. 22, for example, time-division power supply is performed for the following two power supply sets. In other words, power is supplied by time-division switching between a first power supply set in which the power receiver 2A is solely supplied with power and a second power supply set in which the power receivers 2B to 2E are simultaneously supplied with power.

Although a wireless power transfer system including one power source 1A and three to six power receivers 2A to 2F has been taken as an example in the above description, a plurality of power sources may be located at, for example, different angles and various numbers of power receivers may be located at various distances and postures (angles).

Figure 23:
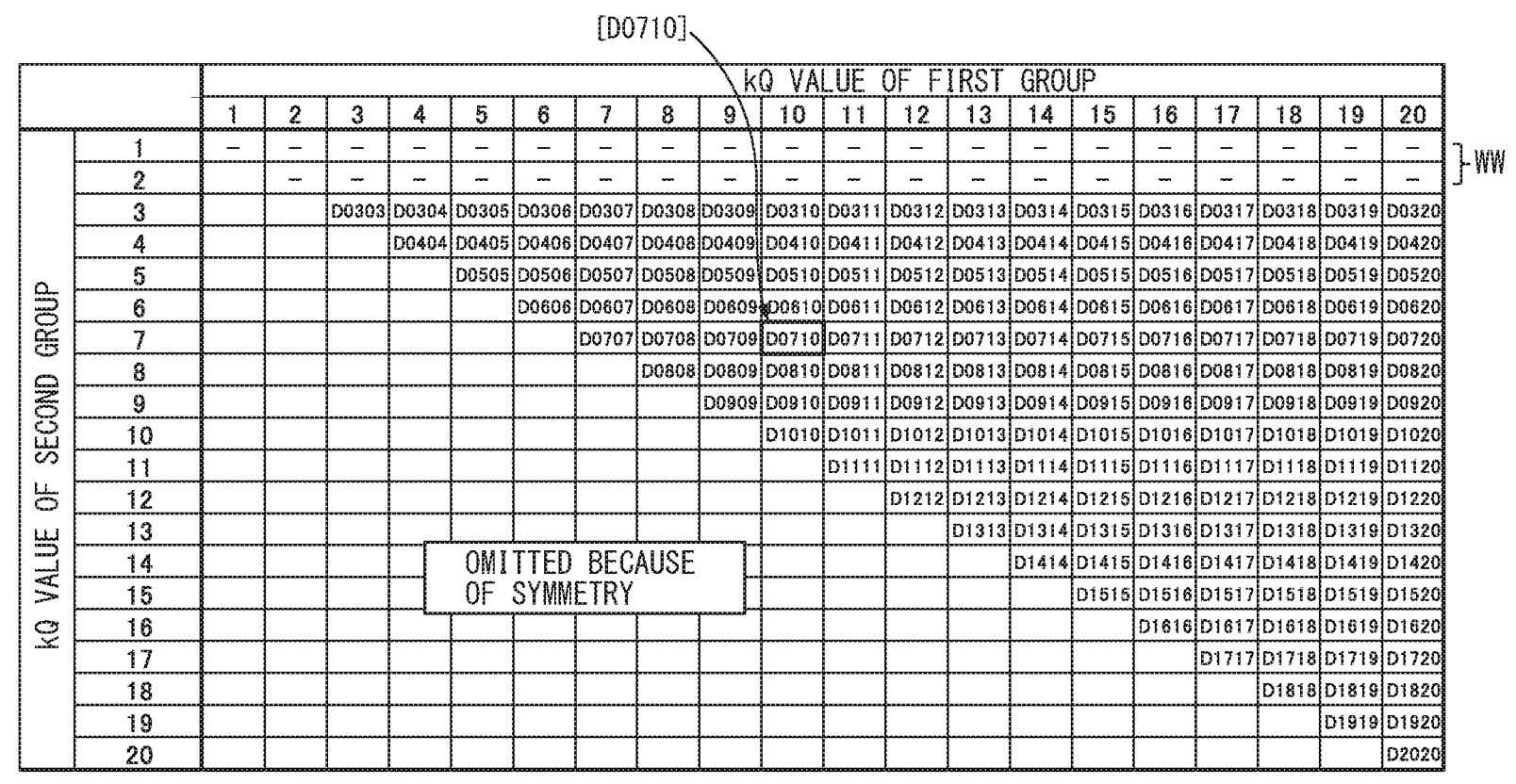

FIG. 23 to FIG. 25 are diagrams for illustrating one example of preliminary arithmetic data in the wireless power transfer control method of the present embodiment. FIG. 23 depicts a table obtained by plotting the kQ value of a first group and the kQ value of a second group, and FIG. 24 depicts a table representing, for example, a portion of D0710 in the table depicted in FIG. 23. FIG. 25 represents, for example, values set in a portion of E0611 in the table depicted in FIG. 24.

As depicted in FIG. 23, in the wireless power transfer control method of the present embodiment, for example, assuming that the kQ value of the first group is "10" and the kQ value of the second group is "7," [D0710] is predefined for two groups having such kQ values.

Note that [D0710] is merely an example, and similar information is predefined for the kQ value of each of the first and second groups. A portion denoted by reference sign WW in FIG. 23 represents a region where the kQ value falls below a predetermined value and power distribution is impossible.

As depicted in FIG. 24, for example, in [D0710] in which the kQ value of the first group is "10" and the kQ value of the second group is "7," assuming, for example, that the ratio of power distribution to two power receivers is controlled to 3:2, [E0611] is predefined. Note that [E0611] is also merely an example, and similar information is predefined for various distribution ratios.

As depicted in FIG. 25, for example, as [E0611] for controlling the power distribution ratio to 3:2 in [D0710], the resonance frequencies, expected overall efficiencies, and the like of the power receivers 2A and 2B are predefined.

In general, the power receivers 2A and 2B receive power at a fixed resonance frequency (6.78 MHz) but when, for example, the power ratio between the power receivers 2A and 2B is desirably set to 3:2 in accordance with the power requirements of the power receivers 2A and 2B, the resonance frequency of the power receiver 2B may be preferably shifted to 6.75 MHz. It may also be confirmed that in this case, the expected overall efficiency is about 67%.

The preliminary arithmetic data depicted in FIG. 23 to FIG. 25 may be obtained by, for example, computing, in advance, data corresponding to various conditions by simulation, arithmetic operation, or the like and storing the data in a memory as, for example, a table (lookup table) for the power source.

Although one or two power sources and power receivers are mainly used in the above description, larger numbers of power sources and power receivers may be used. Further, although power transfer which mainly uses magnetic field resonance has been taken as an example in the description of each embodiment, the present embodiment is also applicable to power transfer which uses electric field resonance.

All examples and conditional language recited herein are intended for pedagogical purposes to aid the reader in understanding the invention and the concepts contributed by the inventor to furthering the art.

Further, the above examples and conditional language are to be construed as being without limitation to such specifically recited examples and conditions, nor does the organization of such examples in the specification relate to a showing of the superiority and inferiority of the invention.

Although the embodiments of the present inventions have been described in detail, it should be understood that the various changes, substitutions, and alterations could be made hereto without departing from the spirit and scope of the invention.

What is claimed is:

1. A wireless power transfer control method for a system including at least one power source and at least two power receivers, wirelessly transfers power from the at least one power source to each of the at least two power receivers using one of magnetic field resonance and electric field resonance, comprising:
   a simultaneous power transfer mode in which power is simultaneously transferred to the at least two power receivers; and
   a time-division power transfer mode in which power is sequentially transferred to the at least two power receivers by time-division switching, wherein the wireless power transfer control method comprises:
   setting an evaluation index for each of the at least two power receivers; and
   performing wireless power transfer by switching between the simultaneous power transfer mode and the time-division power transfer mode, on a basis of the evaluation index, wherein
   the evaluation index is calculated on the basis of
     a first index indicating a degree of coupling of electromagnetic fields in the at least one power source and an interval between the at least two power receivers, and
     a second index indicating a degree of loss of the electromagnetic fields in the at least one power source and the interval between the at least two power receivers, wherein
   the first index comprises a k value,
   the second index comprises a Q value, and
   the evaluation index is calculated as a product of the k value and the Q value, and wherein
   the k value is calculated on the basis of specification information defined between the the at least one power source and the at least two power receivers and a relative positional relationship between the at least one power source and the at least two power receivers.

2. A wireless power transfer control method for a system including at least one power source and at least two power receivers, wirelessly transfers power from the at least one power source to each of the at least two power receivers using one of magnetic field resonance and electric field resonance, comprising:
   a simultaneous power transfer mode in which power is simultaneously transferred to the at least two power receivers; and
   a time-division power transfer mode in which power is sequentially transferred to the at least two power receivers by time-division switching, wherein the wireless power transfer control method comprises:
   setting an evaluation index for each of the at least two power receivers; and
   performing wireless power transfer by switching between the simultaneous power transfer mode and the time-division power transfer mode, on a basis of the evaluation index, wherein
   the evaluation index is calculated on the basis of
   a first index indicating a degree of coupling of electromagnetic fields in the at least one power source and an interval between the at least two power receivers, and
   a second index indicating a degree of loss of the electromagnetic fields in the at least one power source and the interval between the at least two power receivers, wherein
   power transfer is performed in the time-division power transfer mode for the at least two power receivers, the evaluation index of which is smaller than a predetermined first set value, and power transfer is performed in the simultaneous power transfer mode for the at least two power receivers, the first and second evaluation index of which are not less than the predetermined first set value.

3. The wireless power transfer control method according to claim 2, wherein
when at least three power receivers have the evaluation index that is not less than the first predetermined set value, the at least three power receivers are classified into a group on the basis of values of the first and second evaluation index, and
it is determined that power transfer is performed in the simultaneous power transfer mode for the at least three power receivers within the group.

4. The wireless power transfer control method according to claim 3, wherein
the power receivers are classified into a group on the basis of values of the evaluation indices so that power receivers having close evaluation indices belong to an identical group.

5. The wireless power transfer control method according to claim 4, wherein
the power distribution ratio is set by shifting a resonance point of a power receiver resonance coil in a power receiver having a power requirement lower than a received power thereof.

6. The wireless power transfer control method according to claim 5, wherein
the resonance point of the power receiver resonance coil is shifted by changing a capacitance of a capacitor in the power receiver resonance coil.

7. The wireless power transfer control method according to claim 5, wherein
the setting of the power distribution ratio is predefined as preliminary arithmetic data.

8. The wireless power transfer control method according to claim 3, wherein
when a reduction in power transfer efficiency falls outside a tolerance upon power transfer to a plurality of power receivers within the group in the simultaneous power transfer mode, power transfer is performed in the time-division power transfer mode instead of the simultaneous power transfer mode.

9. The wireless power transfer control method according to claim 2, wherein
power transfer to the at least two power receivers in the simultaneous power transfer mode is performed by setting a power distribution ratio on the basis of a power requirement of each power receiver.

10. A wireless power transfer system including at least one power source and at least two power receivers, and wirelessly transfers power from the at least one power source to each of the at least two power receivers using one of magnetic field resonance and electric field resonance, wherein the wireless power transfer system comprises:
a simultaneous power transfer mode in which power is simultaneously transferred to the at least two power receivers; and
a time-division power transfer mode in which power is sequentially transferred to each of the at least two power receivers by time-division switching, wherein
wireless power transfer is performed by switching between the simultaneous power transfer mode and the time-division power transfer mode, on a basis of an evaluation index set for each of the at least two power receivers, wherein
the evaluation index is calculated on a basis of
a first index indicating a degree of coupling of electromagnetic fields in the at least one power source and an interval between the at least two power receivers, and
a second index indicating a degree of loss of the electromagnetic fields in the at least one power source and the interval between the at least two power receivers, wherein
the first index comprises a k value,
the second index comprises a Q value, and
the evaluation index is calculated as a product of the k value and the Q value, and wherein
the k value is calculated on a basis of specification information defined between the at least one power source and the at least two power receivers and a relative positional relationship between the at least one power source and the at least two power receivers.

11. The wireless power transfer system according to claim 10, wherein
the wireless power transfer system comprises at least two power sources and performs three-dimensional wireless power transfer to each of the power receivers.

12. A wireless power transfer system including at least one power source and at least two power receivers, and wirelessly transfers power from the at least one power source to each of the at least two power receivers using one of magnetic field resonance and electric field resonance, wherein the wireless power transfer system comprises:
a simultaneous power transfer mode in which power is simultaneously transferred to the at least two power receivers; and
a time-division power transfer mode in which power is sequentially transferred to each of the at least two power receivers by time-division switching, wherein
wireless power transfer is performed by switching between the simultaneous power transfer mode and the time-division power transfer mode, on a basis of an evaluation index set for each of the at least two power receivers, wherein
the evaluation index is calculated on a basis of
a first index indicating a degree of coupling of electromagnetic fields in the at least one power source and an interval between the at least two power receivers, and
a second index indicating a degree of loss of the electromagnetic fields in the at least one power source and the interval between the at least two power receivers, wherein
power transfer is performed in the time-division power transfer mode for the at least two power receivers, the evaluation index of which is smaller than a predetermined first set value, and
power transfer is performed in the simultaneous power transfer mode for the at least two power receivers, the first and second evaluation index of which are not less than the predetermined first set value.

13. The wireless power transfer system according to claim 12, wherein
when at least three power receivers have the evaluation index that is not less than the first predetermined set value, the at least three power receivers are classified into a group on the basis of values of the first and second evaluation index, and
it is determined that power transfer is performed in the simultaneous power transfer mode for the at least three power receivers within the group.

14. The wireless power transfer system according to claim 13, wherein
when a reduction in power transfer efficiency falls outside a tolerance upon power transfer to a plurality of power receivers within the group in the simultaneous power transfer mode, power transfer is performed in the time-division power transfer mode instead of the simultaneous power transfer mode.

* * * * *